(12) United States Patent
Cutler et al.

(10) Patent No.: US 10,755,587 B2
(45) Date of Patent: *Aug. 25, 2020

(54) AIRCRAFT MOVEMENT LIMITS FOR SAFE FLIGHT

(71) Applicant: Kitty Hawk Corporation, Mountain View, CA (US)

(72) Inventors: Mark Johnson Cutler, Sunnyvale, CA (US); Alexander David Selwa, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/020,765

(22) Filed: Jun. 27, 2018

(65) Prior Publication Data

US 2019/0180634 A1    Jun. 13, 2019

Related U.S. Application Data

(63) Continuation of application No. 15/881,297, filed on Jan. 26, 2018, now Pat. No. 10,037,706.

(60) Provisional application No. 62/596,594, filed on Dec. 8, 2017.

(51) Int. Cl.
| | | |
|---|---|---|
| *G08G 5/00* | (2006.01) | |
| *G08G 5/04* | (2006.01) | |
| *B64C 27/00* | (2006.01) | |
| *G05D 1/00* | (2006.01) | |
| *G05D 1/04* | (2006.01) | |
| *G05D 1/08* | (2006.01) | |
| *G05D 1/02* | (2020.01) | |
| *B64C 27/08* | (2006.01) | |
| *G08G 5/02* | (2006.01) | |
| *G05D 1/10* | (2006.01) | |

(52) U.S. Cl.
CPC .......... *G08G 5/045* (2013.01); *G05D 1/0202* (2013.01); *G05D 1/042* (2013.01); *G05D 1/0808* (2013.01); *G05D 1/0833* (2013.01); *G05D 1/104* (2013.01); *G08G 5/006* (2013.01); *G08G 5/0013* (2013.01); *G08G 5/0021* (2013.01); *G08G 5/0026* (2013.01); *G08G 5/0065* (2013.01); *G08G 5/0082* (2013.01); *G08G 5/025* (2013.01); *B64C 27/08* (2013.01)

(58) Field of Classification Search
CPC .......... B64C 27/00; B64C 27/08; G08G 1/00; G08G 1/16; G08G 5/00; G08G 5/0021; G08G 5/0026; G08G 5/006; G08G 5/025; G08G 5/0013; G05D 1/00; G05D 1/104; G05D 1/142; G05D 1/0808; G05D 1/0833; G05D 1/0202

See application file for complete search history.

(56) References Cited

U.S. PATENT DOCUMENTS

| | | |
|---|---|---|
| 3,568,187 A | 3/1971 | Bechtel |
| 3,737,119 A | 6/1973 | Cheng |
| 5,345,241 A | 9/1994 | Huddle |

(Continued)

*Primary Examiner* — Yonel Beaulieu
(74) *Attorney, Agent, or Firm* — Van Pelt, Yi & James LLP

(57) ABSTRACT

A value for an aircraft movement limit is received where the aircraft movement limit is associated with a manned aircraft. The aircraft movement limit is automatically set to the value. A pilot instruction is received and a control signal for the aircraft is generated using the pilot instruction and the aircraft movement limit.

20 Claims, 16 Drawing Sheets

(56) References Cited

U.S. PATENT DOCUMENTS

| | | | |
|---|---|---|---|
| 6,641,087 B1* | 11/2003 | Nelson | B64D 45/0015 |
| | | | 244/118.5 |
| 6,793,171 B1* | 9/2004 | Clark | B64C 17/00 |
| | | | 244/1 R |
| 8,442,701 B2* | 5/2013 | Blechen | G05D 1/0833 |
| | | | 244/181 |
| 10,036,651 B2* | 7/2018 | Lissajoux | G01C 23/005 |
| 10,037,706 B1* | 7/2018 | Cutler | G05D 1/104 |
| 2007/0235267 A1 | 10/2007 | Liebert | |
| 2010/0087970 A1* | 4/2010 | Blechen | G05D 1/0833 |
| | | | 701/8 |
| 2015/0066240 A1 | 3/2015 | Das Adhikary | |
| 2016/0163203 A1* | 6/2016 | Wang | G05D 1/0214 |
| | | | 701/3 |
| 2017/0106953 A1 | 4/2017 | Cole | |

\* cited by examiner

AIRCRAFT MOVEMENT LIMITS FOR SAFE FLIGHT

CROSS REFERENCE TO OTHER APPLICATIONS

This application is a continuation of U.S. patent application Ser. No. 15/881,297, issued as U.S. Pat. No. 10,037,706, entitled AIRCRAFT MOVEMENT LIMITS FOR SAFE FLIGHT filed Jan. 26, 2018, which claims priority to U.S. Provisional Patent Application No. 62/596,594, entitled DYNAMIC CONSTRAINTS FOR SAFE FLIGHT filed Dec. 8, 2017, both of which are incorporated herein by reference for all purposes.

BACKGROUND OF THE INVENTION

New types of aircraft are being developed for use by inexperienced pilots (e.g., without a pilot's license) and/or for use in closer proximity with other aircraft compared to traditional types of aircraft. For example, these new types of aircraft may be easier to learn (e.g., so that inexperienced pilots without a pilot's license can learn how to fly such aircraft quickly and easily) and perform vertical takeoff and landing (e.g., which permits more aircraft to occupy the same space compared to conventional takeoff and landing aircraft). New safety technologies for use in more crowded flight environments and/or with inexperienced pilots would be desirable. For example, these safety technologies may be used at a training facility where multiple people are simultaneously learning how to fly an aircraft. In some cases, these techniques are used even after a training session.

BRIEF DESCRIPTION OF THE DRAWINGS

Various embodiments of the invention are disclosed in the following detailed description and the accompanying drawings.

DETAILED DESCRIPTION

Figure 1:
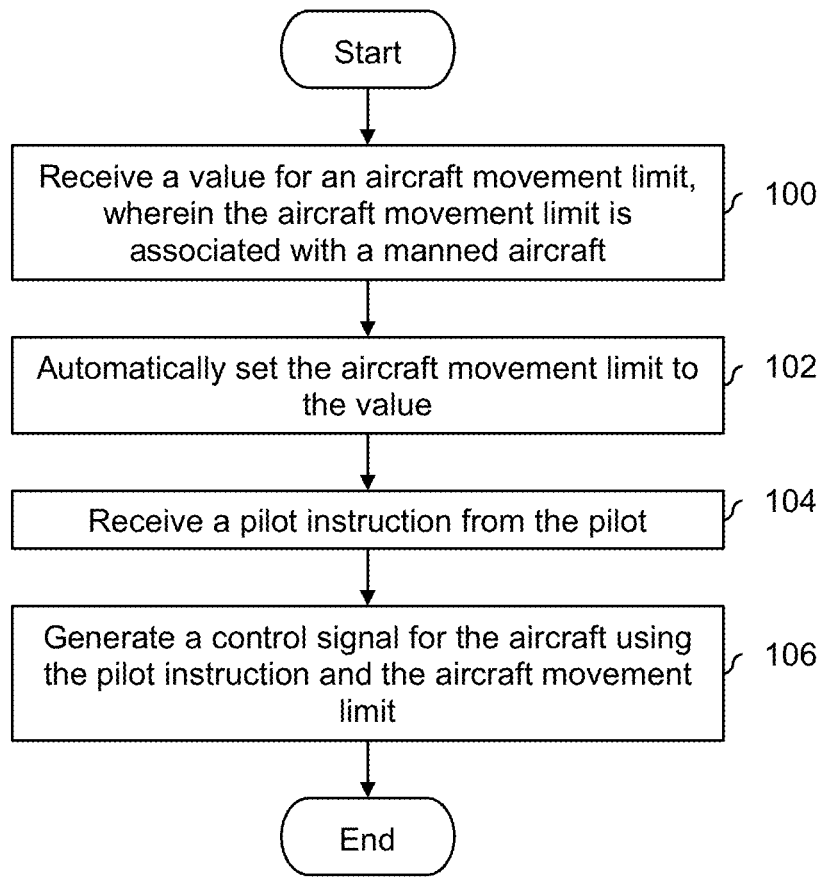
FIG. 1 is a flowchart illustrating an embodiment of a process to set an aircraft movement limit to some value where the aircraft movement limit is used to generate a control signal for an aircraft.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to set or otherwise adjust one or more aircraft movement limits are described herein. In some applications, one or more of the technique(s)

described herein is/are used while pilots are learning how to fly a single-seat aircraft. With a single-seat aircraft, there is no room in the aircraft for a flight instructor. Aircraft movement limits enable an inexperienced pilot to safely learn how to fly a single-seat aircraft, even if there is no flight instructor present in the aircraft and/or even if the pilot is not obeying the instructions of a flight instructor or other supervisor on the ground. In some embodiments, the training site is an overwater training site and one or more aircraft movement limit(s) is/are used to keep the aircraft over the water for safety. In some embodiments, aircraft movement limit(s) (e.g., associated with an altitude limit and/or a velocity limit) is/are adjusted by a flight instructor or other supervisor on the ground depending upon a novice pilot's progress and/or how safely a pilot is flying. In some embodiments, an aircraft's state information (e.g., the aircraft's position with respect to something) is continuously monitored and adjustments to an aircraft movement limit are made dynamically and/or in real time in response to the aircraft's current state.

Although single-seat aircraft and/or vertical takeoff and landing (VTOL) aircraft examples are described herein, the techniques described herein may be used in combination with multi-seat aircraft and/or conventional takeoff and landing (CTOL) aircraft. Also, a variety of techniques are described herein and these techniques may be used in any combination with each other, even if there is no example with that specification combination.

FIG. 1 is a flowchart illustrating an embodiment of a process to set an aircraft movement limit to some value where the aircraft movement limit is used to generate a control signal for an aircraft. In some embodiments, the process is used to control or otherwise constrain the flight of a single-seat aircraft. For example, a single-seat aircraft does not have space for a flight instructor when a new pilot is learning how to fly the aircraft. As will be described in more detail below, the process enables a new pilot to more safely learn how to fly the aircraft, even if a flight instructor is not present in the aircraft (e.g., to provide guidance and/or intervene). Naturally, this process may be used even after some training session has ended (e.g., to protect pilots flying in some common airspace, such as over a recreational airspace over a lake).

At 100, a value for an aircraft movement limit is received, wherein the aircraft movement limit is associated with a manned aircraft. As used herein, the term aircraft movement limit is associated with some limit to the movement of an aircraft (e.g., where a pilot's instructions will be obeyed only to the degree permitted by the aircraft movement limit, if any). The value which is received at step 100 may be obtained from a variety of sources. In some embodiments, the value is specified and/or selected manually, for example, by a flight instructor or some other supervisor. In some embodiments, the value is automatically determined. For example, depending upon some state information associated with the aircraft (e.g., the aircraft's position relative to something, the aircraft's velocity, the aircraft's altitude, etc.), the value which is received at step 100 may be determined using a function, lookup table, mapping, etc.

In some embodiments, an aircraft movement limit includes a position limit associated with the aircraft, including (but not limited to) an attitude limit, an altitude limit, a latitude limit, and a longitude limit. In some embodiments, a position limit is relative to some boundary (e.g., the aircraft's position must remain over a body of water or some smaller area within that body of water). In some embodiments, a position limit is relative to some other aircraft (e.g., any two aircraft must remain a distance of 2r apart, where r is the radius of some "bubble" around each aircraft).

In addition to or as an alternative to a position limit as the aircraft movement limit, in some embodiments, the aircraft movement limit is a velocity limit. Some examples include a forward velocity limit, a lateral velocity limit, a rotational velocity limit (e.g., about a yaw or vertical axis), a vertical velocity limit, or a limit associated with a desired direction of movement (e.g., indicated by an input device such as a joystick). Other examples of an aircraft movement limit include a limit to some other rate associated with the aircraft, such as an attitude rate limit. In some embodiments, an aircraft movement limit includes an acceleration limit.

At 102, the aircraft movement limit is automatically set to the value. By setting the aircraft movement automatically, a pilot cannot override the changing or setting of the aircraft movement limit to the (new) value. For example, if a pilot is flying recklessly, a flight instructor or other supervisor may set the velocity limit(s) of that aircraft to zero so that the aircraft is forced to come to a stop (i.e., hover mid-air). Being able to set the aircraft movement limit to the value enables a flight instructor or other supervisor to take control, even if the pilot is uncooperative (one example of how an aircraft movement limit may be used). Even with a cooperative pilot, being able to set the aircraft movement limit automatically (e.g., without pilot permission) is desirable because then the pilot is not distracted by a request to set or otherwise update the aircraft movement limit.

At 104, a pilot instruction from the pilot is received. For example, in some embodiments, one or more of the techniques described herein is performed by a single-seat, vertical takeoff and landing (VTOL) multicopter. This exemplary multicopter has two input devices via which the pilot instruction can be received: a joystick with a twistable knob at the tip of the joystick (both of which are spring centered) and a (e.g., up-down) thumbwheel which is also spring centered. The two input devices may be placed or positioned so that one hand of the pilot (e.g., the right hand) controls the joystick and the other hand (e.g., the left hand) controls the thumbwheel. To take off or land (in this case, vertically), the pilot uses the up-down thumbwheel to ascend or descend vertically, thus changing the altitude of the multicopter. To yaw (e.g., rotate about a vertical or yaw axis), the twistable knob at the tip or top of the joystick is used. To move in a horizontal plane at a given altitude, the joystick (e.g., excluding the twistable knob) is used. In the event all input devices are released (e.g., the pilot lets go of the thumbwheel and the joystick, including the twistable knob), the multicopter is designed to come to a stop (e.g., if it was moving) and hover in-place, mid-air.

At 106, a control signal for the aircraft is generated using the pilot instruction and the aircraft movement limit. For example, with the exemplary multicopter described above, there are 10 rotors or propellers and the control signal may be for one of the rotors. The control signal is based on the pilot instruction, at least to a degree that the pilot instruction does not violate or exceed the aircraft movement limit (e.g., which is set to some limit at step 102).

For example, consider the scenario where a flight instructor or other supervisor observes that a pilot is flying recklessly or is in distress. The flight instructor or supervisor sets the velocity limit(s) (one type of an aircraft movement limit) of the relevant aircraft to zero. With the velocity limit(s) set to zero, even if the pilot moves the joystick or thumbwheel, the control signal(s) generated at step 106 will correspond to a "hover in-place" value as opposed to a "move" value. The pilot instruction to move at a non-zero velocity will be ignored because it is in violation of the velocity limit(s) which is/are currently set to zero.

In some embodiments, an aircraft movement limit has an initial or default value which is loaded or otherwise set when the aircraft is started. For example, the process shown here may be used to update an aircraft movement limit throughout the flight (e.g., depending upon the instructions from a flight instructor or other supervisor, new values for the aircraft movement limit which are automatically determined based on current state information, etc.). To put it another way, the process of FIG. 1 may be continuously performed during a flight to allow an aircraft movement limit to be continuously or periodically updated as needed.

The following figure shows an exemplary multicopter with floats which permit the multicopter to take off and land on water.

Figure 2:
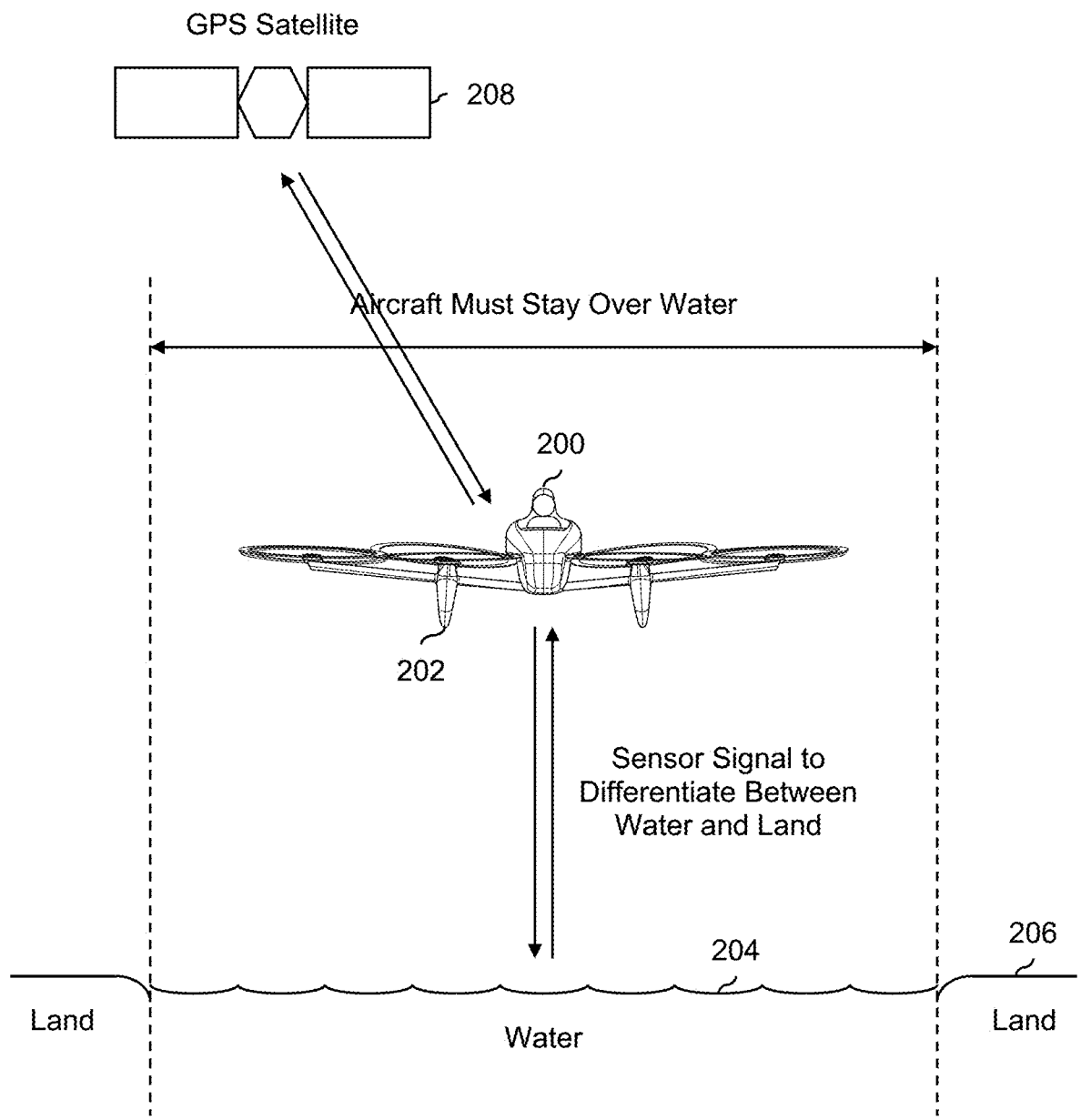
FIG. 2 is a diagram illustrating an embodiment of a multicopter with floats where the multicopter is constrained to fly over water using position limit(s).

FIG. 2 is a diagram illustrating an embodiment of a multicopter with floats where the multicopter is constrained to fly over water using position limit(s). In the example shown, multicopter 200 is a single-seat, VTOL multicopter. The multicopter includes two floats (202) which permit the multicopter to take off and land on water, if desired. In this example, the multicopter is designed to be easy to fly so that inexperienced pilots (e.g., without a pilot's license) can quickly learn how to fly it without having to undergo long hours of flight training. For safety reasons, training of new pilots is envisioned to occur over water because crashing or having a hard landing on water is safer than on land. To further ensure the safety of new pilots as they learn how to fly the multicopter, any of the following techniques (e.g., described in the figure or in other figures) may be used to make the learning experience even safer.

In some embodiments, a position limit (a type of aircraft movement limit) is set to some value that corresponds to "over water." For example, the values received at step 100 in FIG. 1 may correspond to permitted over-water locations (e.g., one or more latitude and longitude pairs which correspond to permitted positions over water, a "stay over water" bit is set to TRUE or FALSE, etc.). In some embodiments, the value received at step 100 has some buffer or margin between the shoreline and the permitted positions.

In some embodiments, to ensure the safety of new pilots, there is always some limit on the multicopter's velocity and position in these overwater training sessions. In one example, all of the multicopters are constrained to have: a position limit (e.g., must stay over water, cannot go higher than an altitude limit, must stay a minimum distance away from other multicopters/pilots, etc.), a velocity limit (e.g., in any direction or along any axis of rotation), an attitude rate limit (e.g., so the pilots cannot go nose-up or nose-down too quickly), etc.

In some embodiments, generation of a control signal at step 106 in FIG. 1 in the context of this example (i.e., the multicopter must remain over water) is position-based and/or sensor-based. For example, with a sensor-based approach, there may be sensors mounted to the bottom of the multicopter which (e.g., based on the returned signal) can differentiate between water (204) and land (206). Or, with a position-based approach, the aircraft may communicate with a GPS satellite (208) in order to determine its position (e.g., latitude and longitude). Given its position, in combination with some database and/or map of bodies of water and their location(s), it can be determined whether the multicopter is over land or water.

Being able to configure an aircraft movement limit so that the aircraft can only fly over water permits a variety of flight modes which can be turned on or off as desired. For example, the multicopter (200) can also take off and land on land. In one example usage scenario, on weekends, the multicopter is brought to a body of water and is flown over the body of water. During this time, for safety, the aircraft movement limit(s) are set so that the aircraft can only fly over water. At the end of the day, the multicopter is brought back home where the multicopter is used as a personal transportation device to fly between a home and an office during weekdays. This flight path goes over land and for this type of flight path, the aircraft movement limit can be (re)set so that the multicopter is permitted to fly over land.

This example of using a position limit to force a multicopter to fly over water is described more generally and/or formally in the flowchart below.

Figure 3:
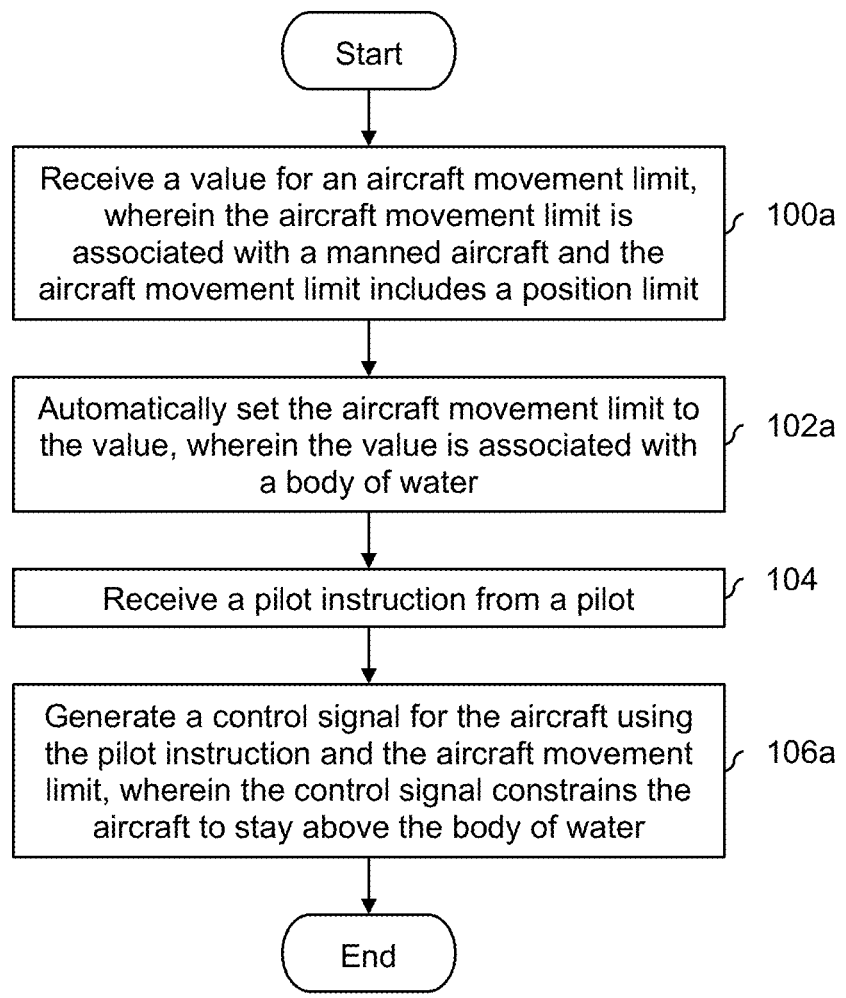
FIG. 3 is a flowchart illustrating an embodiment of a process to set a position limit so that an aircraft remains over water.

FIG. 3 is a flowchart illustrating an embodiment of a process to set a position limit so that an aircraft remains over water. FIG. 3 is related to FIG. 1 and for convenience, related steps use similar or the same reference numbers. In various embodiments, the process may be initiated by a pilot (e.g., so that the pilot can put an aircraft into this mode even if they are by themselves), a flight instructor or other supervisor (e.g., getting aircraft ready for a training session), or by a base station near a body of water (e.g., which automatically detects aircrafts in the vicinity of the body of water and automatically initiates the process shown here).

At 100a, a value for an aircraft movement limit is received, wherein the aircraft movement limit is associated with a manned aircraft pilot and the aircraft movement limit includes a position limit. For example, the position limit may include limits on an aircraft's permitted latitude and/or longitude (e.g., so that the aircraft remains over water which is safer than flying over land). In some embodiments, the value is for or associated with some part of the body of water so that the aircraft stays over a subsection of the body of water instead of being able to roam over the entire body of water.

At 102a, the aircraft movement limit is automatically set to the value, wherein the value is associated with a body of water. In one example, before a training session or lesson, a flight instructor flies the aircraft from land and lands on the body of water. The aircraft movement limit is then set at step 102a.

At 104, a pilot instruction is received from a pilot. For example, the pilot instruction may push a joystick forward and hold it, causing an exemplary multicopter to fly forward and approach the shoreline of a body of water.

At 106a, a control signal for the aircraft is generated using the pilot instruction and the aircraft movement limit, wherein the control signal constrains the aircraft to stay above the body of water. For example, as an exemplary multicopter approaches the shoreline, the control signal (e.g., directed to one of the rotors) will transition from a "fly forward" value to a "hover in place" value so that the multicopter does not cross some imaginary boundary (e.g., at or near the shoreline). See, for example, FIG. 2. In some embodiments, the aircraft is constrained to remain over some region of the body of water (e.g., as opposed to being able to range over the entire body of water). For example, if there are two or more aircraft flying over the body of water, in some embodiments, the aircraft may be confined or otherwise constrained to different regions of the body of water.

As described above, at least some of the techniques described herein may be used to ensure the safety of pilots learning how to fly. The following figure shows an example of a base station which may be used to adjust the value of an aircraft movement limit (e.g., during a training session of new pilots, or even after a training session by a lifeguard or monitor of a shared recreational body of water).

Figure 4:
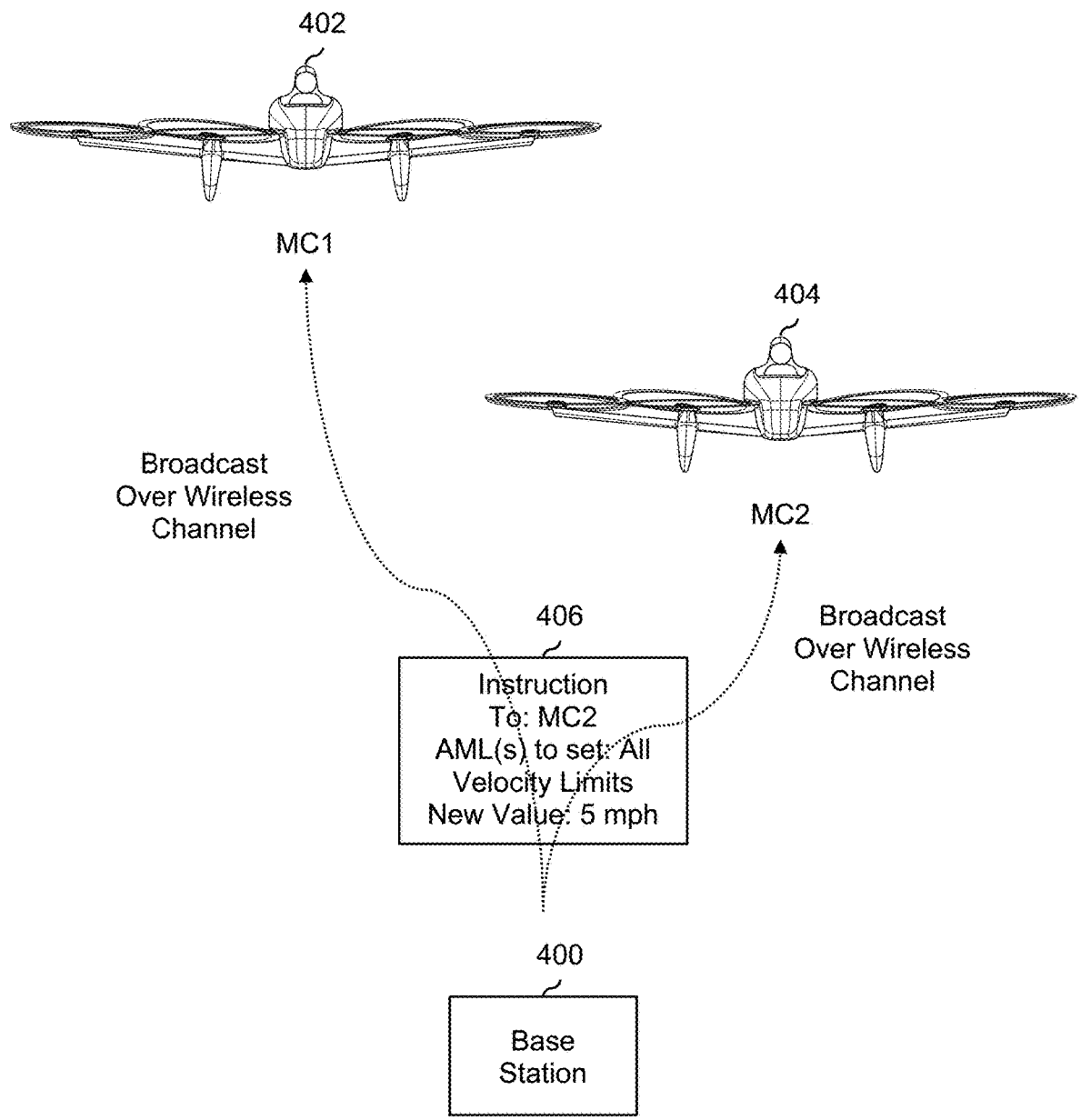
FIG. 4 is a diagram illustrating an embodiment of a base station which is capable of changing the value of an aircraft movement limit in a selected aircraft.

FIG. 4 is a diagram illustrating an embodiment of a base station which is capable of changing the value of an aircraft movement limit in a selected aircraft. In this example, multiple pilots are learning how to fly a multicopter. To mitigate damage in the event of a hard landing or crash, the multicopters are forced to fly over a body of water (not shown), for example using some of the techniques described above. In this example, there is a flight instructor or supervisor (not shown) on the ground at this overwater training site. The flight instructor has access to a base station (400) which can selectively adjust an aircraft movement limit on a selected multicopter, as or if needed.

In this example, the pilot of the first multicopter, MC1 (402), is flying in a safe and responsible manner. The pilot of the second multicopter, MC2 (404), is flying too fast and/or recklessly. To slow the second multicopter down, one or more velocity limits (a type of aircraft movement limit) for MC2 (404) are decreased using the base station. For example, using the base station, the flight instructor may identify MC2 as the multicopter to which the instruction is directed and specify one or more new velocity limits. In some embodiments, predefined limits (e.g., multiples of 5 or 10) and/or qualitative suggestions (e.g., slow down a little, slow down a lot, stop, etc.) are offered by the base station. The base station then generates an instruction (406) and broadcasts it over a wireless channel so that it is received by both MC1 and MC2.

In this example, the instruction includes an identification of the multicopter to which the instruction is directed (in this case, MC2). With this "To" field, the first multicopter (MC1) will know that the instruction is not directed to it and ignore the instruction. The second multicopter (MC2) will see its identifier in the "To" field and make the changes specified by the instruction.

Each multicopter may manage multiple aircraft movement limits. Since not all of the aircraft movement limits are necessarily being set by a given instruction, the example instruction (406) identifies which aircraft movement limit(s) are being set or otherwise updated by this particular instruction. In this example, all velocity limits are being set or otherwise updated by this instruction. The instruction also includes new values for those specified limits, which in this example sets all velocity limits to a new value of 5 mph.

Some examples of various aircraft movement limits include an altitude limit (e.g., above which the multicopter is not permitted to fly) as well as one or more velocity limits (e.g., associated with movement relative to various directions, planes, axes, etc.) where the multicopter is not permitted to fly faster than the limit (e.g., relative to the associated direction, plane, axis, etc.). For example, there may be a vertical velocity limit (e.g., how fast the multicopter can ascend or descend along a vertical axis), a forward flight velocity limit (e.g., for flight within some lateral plane at a given altitude), a yaw rate limit (e.g., how fast the multicopter is permitted to rotate about a yaw or vertical axis), as well as a pitch rate limit (e.g., how fast the multicopter is permitted to pitch nose-up or nose-down about a pitch axis), etc. The latter two limits may more generally be referred to as rotational rate limits.

In an extreme case, the velocity limit(s) of MC2 may be reduced to zero, such that the multicopter comes to a stop, hovering mid-air. In some embodiments, if desired, the base station may be used to manually land the halted multicopter or initiate an autonomous landing sequence from some base station (e.g., managed by an on-the-ground flight instructor or other supervisor). As with the instruction to change the velocity limit(s), the instruction may be sent wirelessly and include some unique aircraft identifier so that the appropriate aircraft lands and the other aircraft are not forced to land.

Alternatively, if a pilot is demonstrating progress and is flying in a responsible manner, an aircraft movement limit may be increased. For example, since the pilot of MC1 (402) has been flying safely on the current settings, one or more aircraft movement limits, such as a velocity limit and/or an altitude limit, may be increased.

In various embodiments, the base station may be implemented in a variety of ways depending upon the facilities available at the overwater training site. For example, if there is no power source, the base station may be a battery-powered, hand-held, and/or portable base station. Alternatively, if an AC power source is available, then the base station may operate off an AC power supply and be more permanent and/or larger. Any appropriate wireless communication channel may be used.

This example is described more generally and/or formally in the flowchart below.

Figure 5:
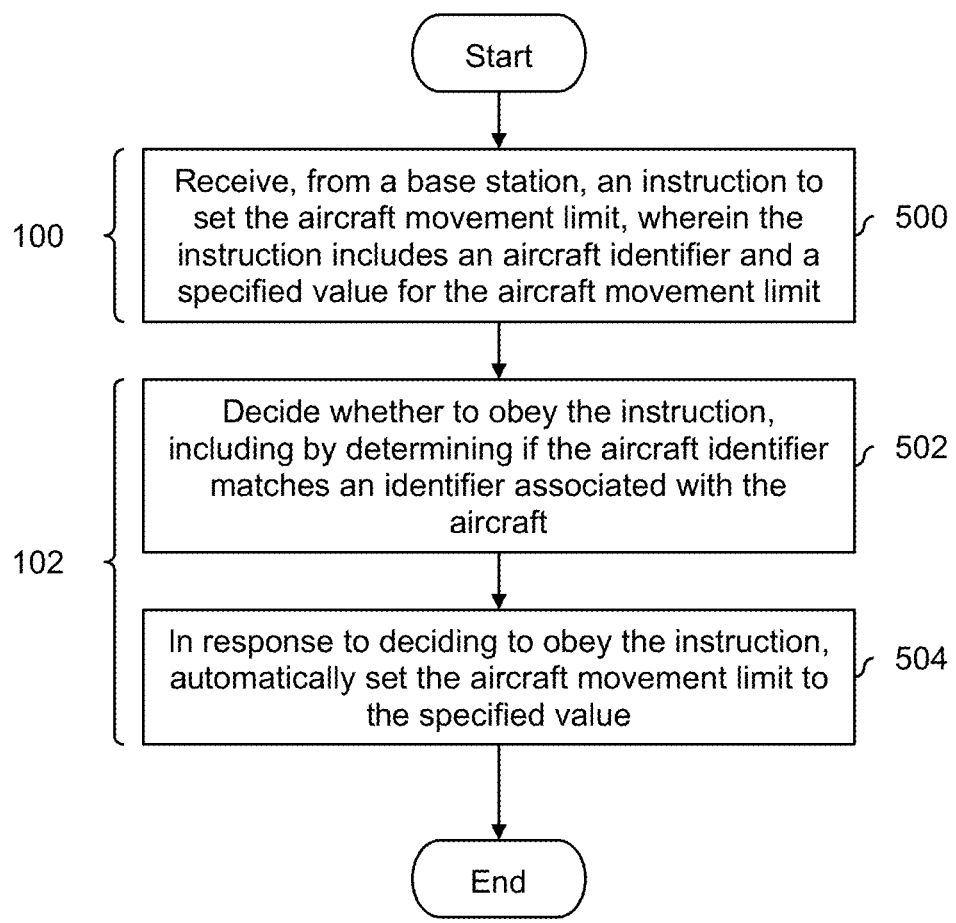
FIG. 5 is a flowchart illustrating an embodiment of a process to set an aircraft movement limit using a base station.

FIG. 5 is a flowchart illustrating an embodiment of a process to set an aircraft movement limit using a base station. In some embodiments, the process of FIG. 5 is used to perform some of the steps in the process of FIG. 1.

At 500, an instruction to set the aircraft movement limit is received from a base station, wherein the instruction includes an aircraft identifier and a specified value for the aircraft movement limit. For example, instruction 406 in FIG. 4 includes an aircraft identifier of "MC2" and a new value for one or more velocity limit(s) as "5 mph." In some embodiments, this is how a value for an aircraft movement limit is received at step 100 in FIG. 1.

At 502, it is decided whether to obey the instruction, including by determining if the aircraft identifier matches an identifier associated with the aircraft. For example, MC1 (402) in FIG. 4 would ignore instruction 406 but MC2 (404) would perform the instruction to decrease the velocity limit(s). In some embodiments, the decision at step 502 includes verification and/or security processes to prevent a malicious and/or unauthorized user from changing an aircraft movement limit.

At 504, in response to deciding to obey the instruction, the aircraft movement limit is automatically set to the specified value. For example, in FIG. 4, the instruction (406) includes an aircraft identifier associated with MC2 (404) and so MC2 would make the change or update to the specified aircraft movement limit specified by the instruction. In some embodiments, setting the aircraft movement limit to a value at step 102 in FIG. 1 includes step 502 and step 504.

Conversely, if it is decided not to obey the instruction, then the aircraft movement limit(s) is/are not changed. For example, in FIG. 4, the instruction (406) to change an aircraft movement limit is directed to MC2 (404), not MC1 (402) and so the latter multicopter would ignore the instruction, keeping its aircraft movement limit unchanged.

The following figures describe an example of geofencing where a body of water is divided into two regions with the arrival of a second multicopter. In this example, each region or zone would have at most one multicopter to prevent collisions.

Figure 6A:
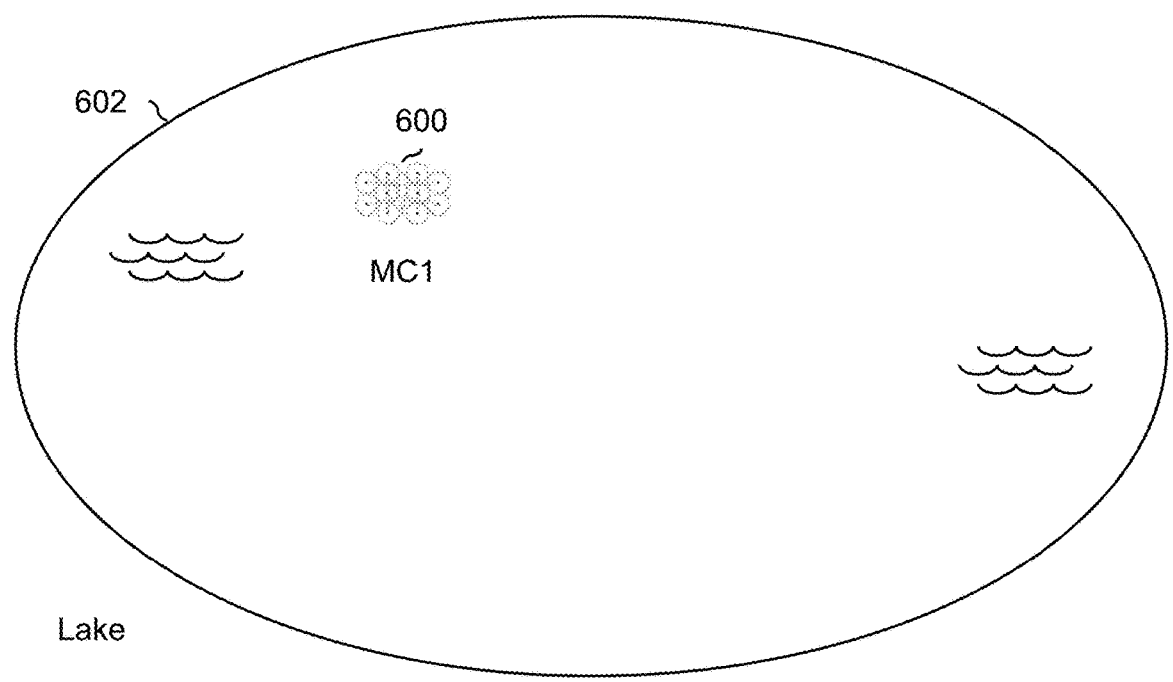
FIG. 6A is a diagram illustrating a lake with a single multicopter.

FIG. 6A is a diagram illustrating a lake with a single multicopter. In the example shown, a single multicopter (600) is flying over a lake (602). When only one multicopter is present, that multicopter is permitted to fly or otherwise roam over all parts of the lake. To put it another way, there is no part of the lake that is off limits, at least in the state or time shown here.

Figure 6B:
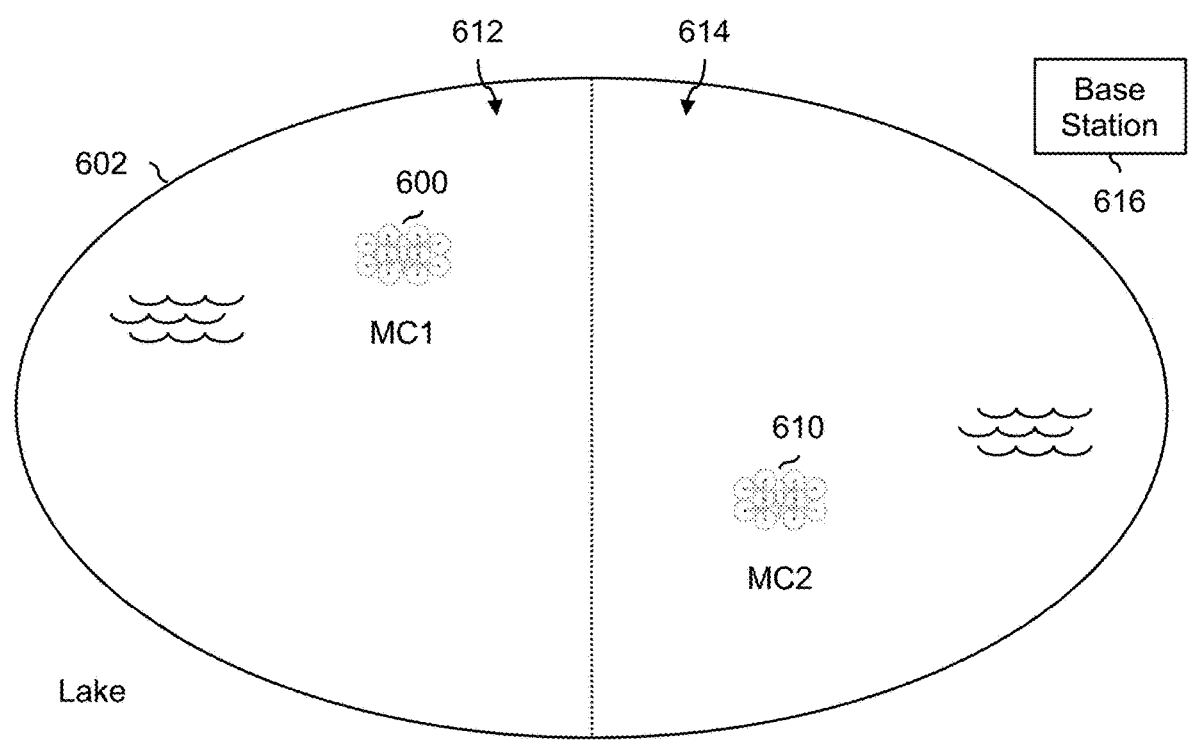
FIG. 6B is a diagram illustrating a lake with two multicopters.

FIG. 6B is a diagram illustrating a lake with two multicopters. In this example, a second multicopter (610) has arrived at the lake. To prevent a collision between the two multicopters, the lake (602) is divided in half to create or otherwise define two regions: a first region (612) and a second region (614). MC1 (600) is only permitted to fly over the first region (612) and cannot fly in the second region (614). Similarly, MC2 (610) is only permitted to fly over the second region (614) and is not permitted to fly over the first region (612). This is one example of how geofencing may be implemented.

Base station 616 performs a number of functions or operations to support this example division of the lake. For example, each of the multicopters broadcasts information over a wireless channel which permits the base station to know how many multicopters are flying over the lake. For example, each multicopter may broadcast its aircraft identifier (at least) which permits the base station to subsequently direct instructions (e.g., to change an aircraft movement limit) to a particular multicopter. This information broadcast by the multicopters also permits the base station to detect when there is a change from a single multicopter (as shown in FIG. 6A) to two multicopters (as shown in FIG. 6B).

Once the base station detects an increase in the number of multicopters from one to two, the base station sets the appropriate aircraft movement limits in MC1 and MC2 so that they fly over the first and second regions, respectively. In some embodiments, the base station stores a variety of floorplans for various numbers of multicopters so that there are predefined regions readily available. For example, the base station may have a floorplan for two multicopters (e.g., with two predefined regions), a floorplan for three multicopters (e.g., with three predefined regions), etc.

In some embodiments, the base station performs operations or functions to more smoothly and/or safely switch from n regions to (n+1) regions or vice versa. For example, it may be safer to have all of the multicopters come to a stop when changing the number and/or location of the regions. A base station may issue the instructions to set the appropriate aircraft movement limits, bringing all of the multicopters to a stop. The base station may then issue a second round or set of instructions to the stopped multicopters to update the appropriate aircraft movement limits with the new regions. The base station may then issue a third round or set of instructions to update the appropriate aircraft movement limits so that the multicopters can again move (e.g., within the new region allocated to that particular multicopter).

To more quickly and/or safely switch from the geofencing shown in FIG. 6A to that shown in FIG. 6B, in some embodiments, the base station is used to escort or nudge a multicopter to a different part of the lake if its current position is not within its new region. For example, suppose that MC1 (600) had been in the second region (614) when the switch from a single region to two regions was about to be performed (not shown here). In some embodiments, a flight instructor uses the base station to take over the controls of MC1 (600) and fly MC1 from the second region (614) to the first region (612) to more quickly make the switch. Alternatively, in some embodiments, the base station is used to initiate some autonomous flight of MC1 from the second region (614) to the first region (612). In contrast, if a novice pilot had to fly out of the second region (614) to the first region (612) on their own so that the 2-region floorplan could be obeyed, it might take longer, be more stressful for the pilot, and/or increase the likelihood of a collision.

Similarly, the base station may detect when the number of multicopters flying over the lake decreases, for example, because someone is done flying. For brevity, associated operations are not described herein, but operations and/or processes (similar to those described above) may be performed to make the switch from (n+1) regions to n regions easier, faster, and/or safer.

In some embodiments, a base station performs these operations or functions autonomously or otherwise automatically (e.g., without requiring the intervention of a flight instructor or supervisor on the ground). For example, this would enable a family or group of friends to fly together over a body of water without having to have someone man the base station. People could come and go throughout the day and the different regions (e.g., enforced through the appropriate setting of the appropriate aircraft movement limit(s)) would be updated automatically.

The following figure describes this more formally and/or generally in a flowchart.

Figure 7:
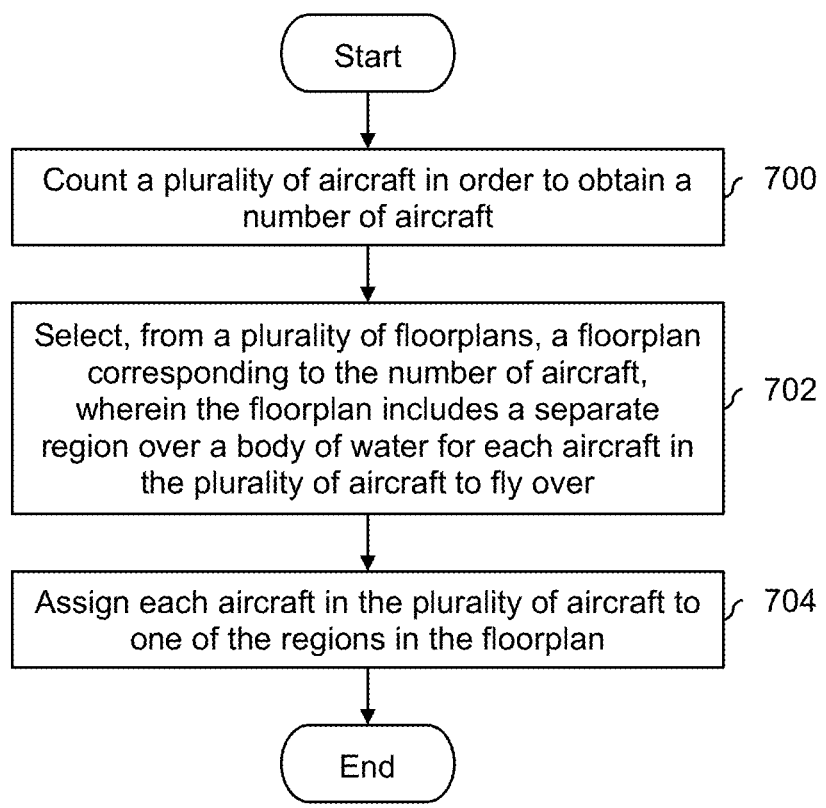
FIG. 7 is a flowchart illustrating an embodiment of a process to perform geofencing using regions over a body of water.

FIG. 7 is a flowchart illustrating an embodiment of a process to perform geofencing using regions over a body of water. In the example shown, the process is performed by a base station, such as base station 616 in FIG. 6B. In the context of FIG. 1, the value received at step 100 for a given aircraft movement limit (e.g., used to enforce the new boundaries of the new floorplan) may be received from a base station and the base station performs this process in order to determine or otherwise generate that value.

At 700, a plurality of aircraft is counted in order to obtain a number of aircraft. For example, in FIG. 6B, base station 616 would count two multicopters: MC1 (600) and MC2 (610).

At 702, a floorplan corresponding to the number of aircraft is selected from a plurality of floorplans, wherein the floorplan includes a separate region over a body of water for each aircraft in the plurality of aircraft to fly over. For example, base station 616 in FIG. 6B may store a floorplan with two regions for when there are two multicopters, a floorplan with three regions for when there are three multicopters, and so on. For the example shown in FIG. 6B, the floorplan for two multicopters would be selected (e.g., where the lake is divided down the middle).

At 704, each aircraft in the plurality of aircraft is assigned to one of the regions in the floorplan. For example, in FIG. 6B, MC1 (600) is assigned to the first region (612) and MC2 (610) is assigned to the second region (614). Depending upon the assigned region, the base station will update the appropriate aircraft movement limits. For example, base station 616 in FIG. 6B may send an instruction to update one or more location limits in MC1 (600) to value(s) that correspond to the first region (612). Similarly, the base station (616) would update appropriate location limit(s) in MC2 (610) to value(s) that correspond to the second region (614).

This process may be repeatedly performed so that as the number of aircraft changes (e.g., some aircraft begin flying and others end their flight), the appropriate floorplan and/or number of regions may be used.

The following figures describe various examples where the state of the aircraft (e.g., a distance from the aircraft, the aircraft's velocity, the aircraft's altitude, etc.) is used to select an appropriate value for an aircraft movement limit. First, a more general process of this is described. Then, more specific examples which show different applications or usage scenarios are described.

Figure 8:
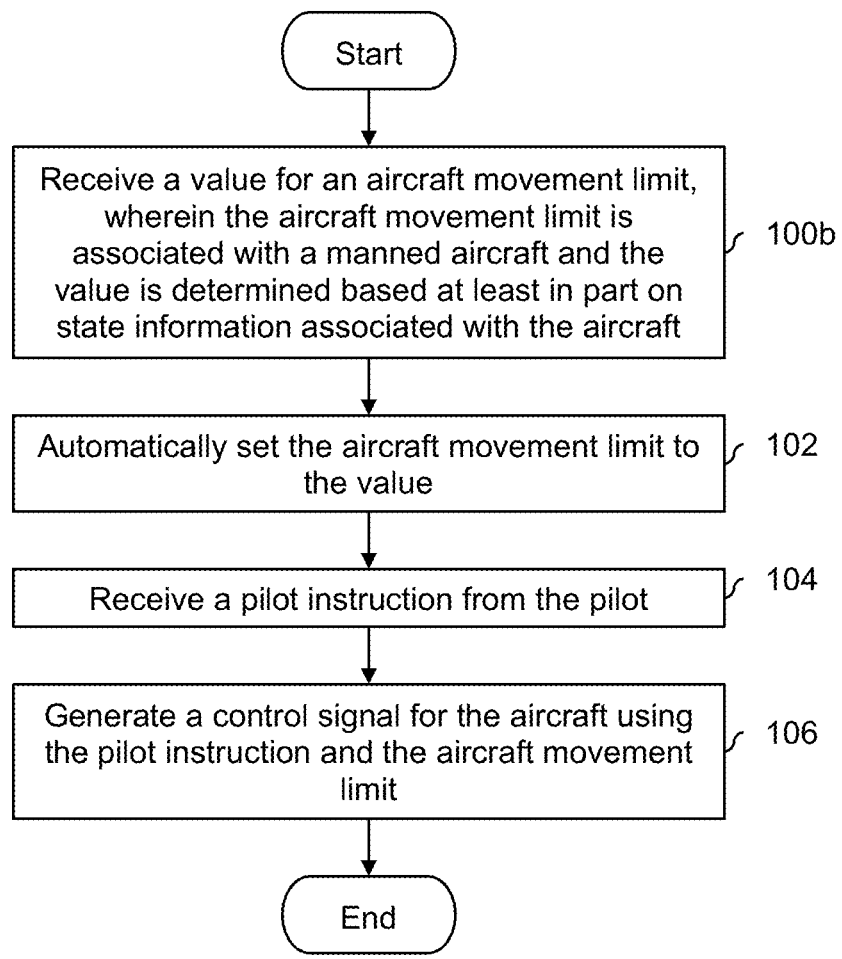
FIG. 8 is a flowchart illustrating an embodiment of a process to set an aircraft movement limit to using a value which is selected based at least in part on state information associated with the aircraft.

FIG. 8 is a flowchart illustrating an embodiment of a process to set an aircraft movement limit to using a value which is selected based at least in part on state information associated with the aircraft. FIG. 8 is related to FIG. 1 and for convenience the same or similar reference numbers are used to indicate related steps.

At 100b, a value for an aircraft movement limit is received, wherein the aircraft movement limit is associated with a manned aircraft and the value is determined based at least in part on state information associated with the aircraft. For example, as will be described in more detail below, in various embodiments, the state information may relate to a distance from the aircraft (e.g., along a desired direction of movement), an (absolute) altitude of the aircraft, or a (forward) velocity of the aircraft. Depending upon the state of the aircraft, appropriate values for certain aircraft movement limits are set automatically (e.g., by the flight controller or computer and/or without intervention by a flight instructor or supervisor on the ground).

At 102, the aircraft movement limit is automatically set to the value. For example, in some cases, the aircraft movement limit is a velocity limit along a desired direction of movement which is used to perform geofencing. In some embodiments, the aircraft movement limit is a velocity limit and is used to slow down aircraft which are flying low to the ground. In some embodiments, the aircraft movement limit includes an attitude limit which is used to reduce stress on certain types of multicopters which have certain structural vulnerabilities.

At 104, a pilot instruction is received from a pilot. At 106, a control signal is generated for the aircraft using the pilot instruction and the aircraft movement limit. As will be described in more detail below, in some embodiments (e.g., where a velocity limit is used to enforce a geofence), any pilot instruction to fly beyond a boundary would be countermanded by limiting a desired velocity per the velocity limit. Or, if a low flying aircraft tries to fly faster than a velocity limit's current value, the "too fast" desired velocity would be reduced in order to comply with the velocity limit. Or, if an aircraft is flying forward too fast and tries to go nose-up or nose-down too much at the same time (which would stress the airframe), the attitude limit would act to limit the desired attitude, thus reducing the stress on the airframe.

The following figures describe more specific examples of FIG. 8. First, a geofencing example is described where a multicopter must remain over a body of water.

Figure 9A:
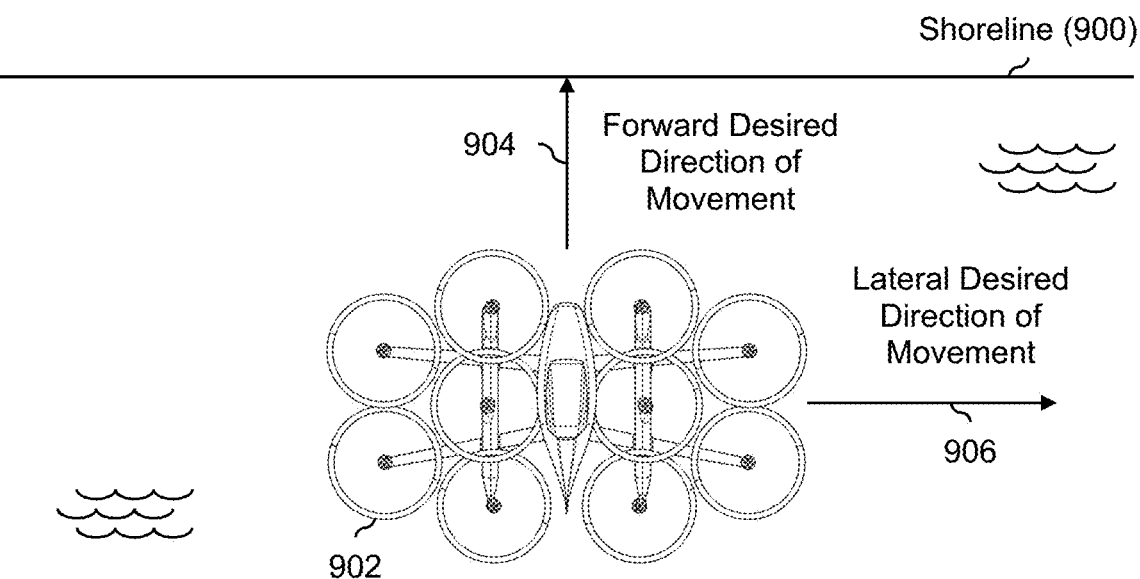
FIG. 9A is a diagram illustrating an embodiment of a velocity limit which is set based on a distance along a desired direction of movement to a shoreline.

FIG. 9A is a diagram illustrating an embodiment of a velocity limit which is set based on a distance along a desired direction of movement to a shoreline. In the example shown, one or more velocity limits (a type of aircraft movement limit) is/are used to enforce a geofence which includes a shoreline (900). In other words, multicopter 902 is constrained to fly over water over some part of the body of water or (alternatively) the entire body of water. To ensure that the multicopter does not fly past shoreline 900 (e.g., because of some drift or error due to sensor noise, wind, etc.), the velocity limit is decreased (e.g., automatically) as the distance (measured along some desired direction of movement) gets closer to the shoreline (or, more generally, some border or geofence). Although a shoreline is used in this example as a geofence boundary, it is noted that this technique applies more generally to any type of geofence boundary, not just a shoreline. In various embodiments, using a velocity limit to enforce a geofence is used alone or in combination with using a position limit to enforce a geofence.

The desired direction of movement is indicated using some input device, such as a joystick. For example, suppose the pilot pushed the joystick forward so that the desired direction of movement is forward (904). The distance between the multicopter (902) and the shoreline (900) along the forward desired direction of movement (904) is calculated and (generally speaking) as that distance decreases, the velocity limit in that direction (in this case, the forward direction (904)) would similarly decrease until it reaches zero. See, for example, the next figure.

Figure 9B:
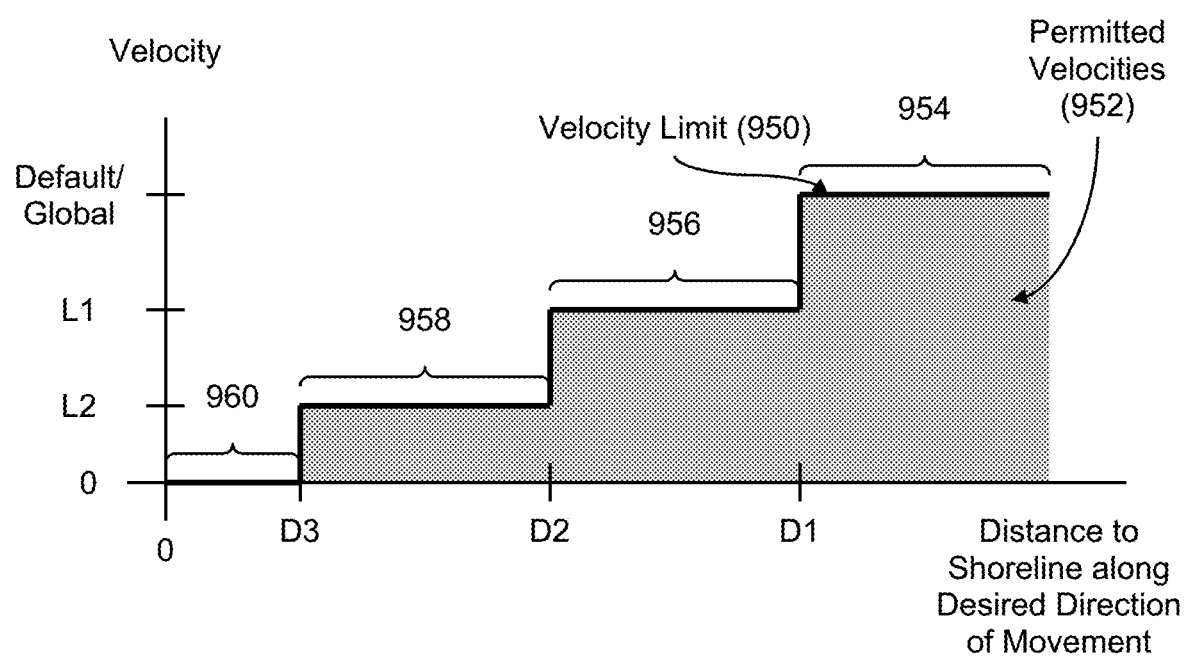
FIG. 9B is a graph illustrating an embodiment of velocity limits which are adjusted based on a distance along a desired direction of movement to a shoreline.

FIG. 9B is a graph illustrating an embodiment of velocity limits which are adjusted based on a distance along a desired direction of movement to a shoreline. In this example, the x-axis is the distance to the shoreline along some desired direction of movement and the y-axis shows velocity (e.g., along the desired direction of movement). Line 950 shows the velocity limit (e.g., which is set and/or adjusted per this technique) and the gray area (952) beneath that line shows the relevant permitted velocities. At distances of D1 or greater (e.g., to the shoreline along the desired direction of movement), the velocity limit (again, along the relevant desired direction of movement) is set to some global and/or default value. See, e.g., region 954.

If the aircraft gets closer to the shoreline, the velocity limit is reduced to L1 for distances between D2 and D1 to the shoreline (see, e.g., region 956). If the aircraft gets even closer to the shoreline, the velocity limit is further reduced to L2 for distances between D3 and D2 to the shoreline (see, e.g., region 958). Finally, at distances between 0 and D3 to the shoreline, the velocity limit is reduced to zero (see, e.g., region 960). For example, even if the pilot of multicopter 902 in FIG. 9A is in this range and is pushing the joystick forward, the multicopter will not fly forward because the forward velocity limit is set to zero. As described above, this keeps the multicopter over the lake, even if there is some wind gust and/or sensor noise which might otherwise inadvertently cause the multicopter to cross the shoreline boundary.

It is noted that the velocity limit of zero in region 960 is for a current or given desired direction of movement (in this example, forward) and other desired directions of movement may have non-zero velocity limits which would permit the aircraft to fly in those directions. For example, in FIG. 9A, suppose that multicopter 902 had continued to fly forward so that it is within region 960 in FIG. 9B with respect to the forward direction of movement (904). Although the limit on the forward direction of movement is set to zero, other directions of movement have non-zero velocity limits. For example, along lateral desired direction of movement (906), assume that the distance to the shoreline is greater than D1 such that the velocity limit along lateral direction 906 is set to some global and/or default value (see region 954 in FIG. 9B) so that the pilot can fly laterally (i.e., sideways, parallel to the shoreline) up to the default or global velocity limit if desired.

Some types of movement supported by the exemplary multicopter do not change the effective distance to the shoreline and therefore are not set or otherwise adjusted per this technique. For example, the exemplary multicopter can rotate about a vertical (yaw) axis of rotation. Such a rotation does not change the position of the multicopter relative to the shoreline and therefore any limit related to rotating about a vertical (yaw) axis of rotation is not adjusted or otherwise set in the manner described here.

Similarly, if so instructed by a pilot, the exemplary multicopter can ascend or descend along the vertical (yaw) axis without any front-to-back or side-to-side (lateral) movement. This up-down type of movement also does not effectively move the multicopter any closer to or further away from the shoreline and therefore a velocity limit in the vertical direction is not limited per the technique described here.

By setting or otherwise adjusting velocity limits in this more nuanced manner (e.g., instead of enforcing the same limit for all velocities in all directions), the multicopter is forced to slow down in those directions which would bring it closer to the shoreline (or, more generally, the geofence boundary) while not necessarily limiting the velocity in other directions (e.g., which would move the multicopter further away from the shoreline or which would not effectively change the distance of the multicopter to the shoreline (e.g., rotation)). This means that even if the multicopter flies up to the shoreline and it is "touching" the shoreline, it can still fly away, for example, by rotating around a vertical (yaw) axis to face the center of the body of water and subsequently flying away from the shoreline, or by flying backwards away from the shoreline (e.g., without first rotating to face the center of the body of water).

In one example of how this example fits into FIG. 8, the aircraft movement limit (e.g., referred to in step 100b) includes a velocity limit and the value is determined based at least in part on state information associated with the aircraft (see, e.g., step 100b), including by determining a distance along a desired direction of movement from the aircraft to a boundary (where the state information associated with the aircraft includes the distance) and determining the value for the velocity limit based at least in part on the distance where a first, lower value is determined for the velocity limit based at least in part on a first, closer distance (see, e.g., region 960) and a second, higher value is determined for the velocity limit based at least in part on a second, further distance (see, e.g., region 958).

In some embodiments, limits on deceleration (or, more generally, acceleration) or other limits ensure that any limiting of a desired velocity (e.g., specified or requested by the pilot) per the appropriate velocity limit does not induce a sudden deceleration or other undesirable effect (e.g., when generating a control signal at step 106 in FIG. 8 which enforces a velocity limit set using this technique). To put it another way, in some embodiments, any enforcement of a velocity limit is balanced with enforcement of one or more other limits (e.g., on deceleration) to produce a desirable flight experience (e.g., so long as in the long run the velocity limit is eventually obeyed).

A similar technique of adjusting or otherwise setting velocity limits can be used to enforce a nucleoid (e.g., bubble-like) type of geofence. The following figure shows an example of this.

Figure 10A:
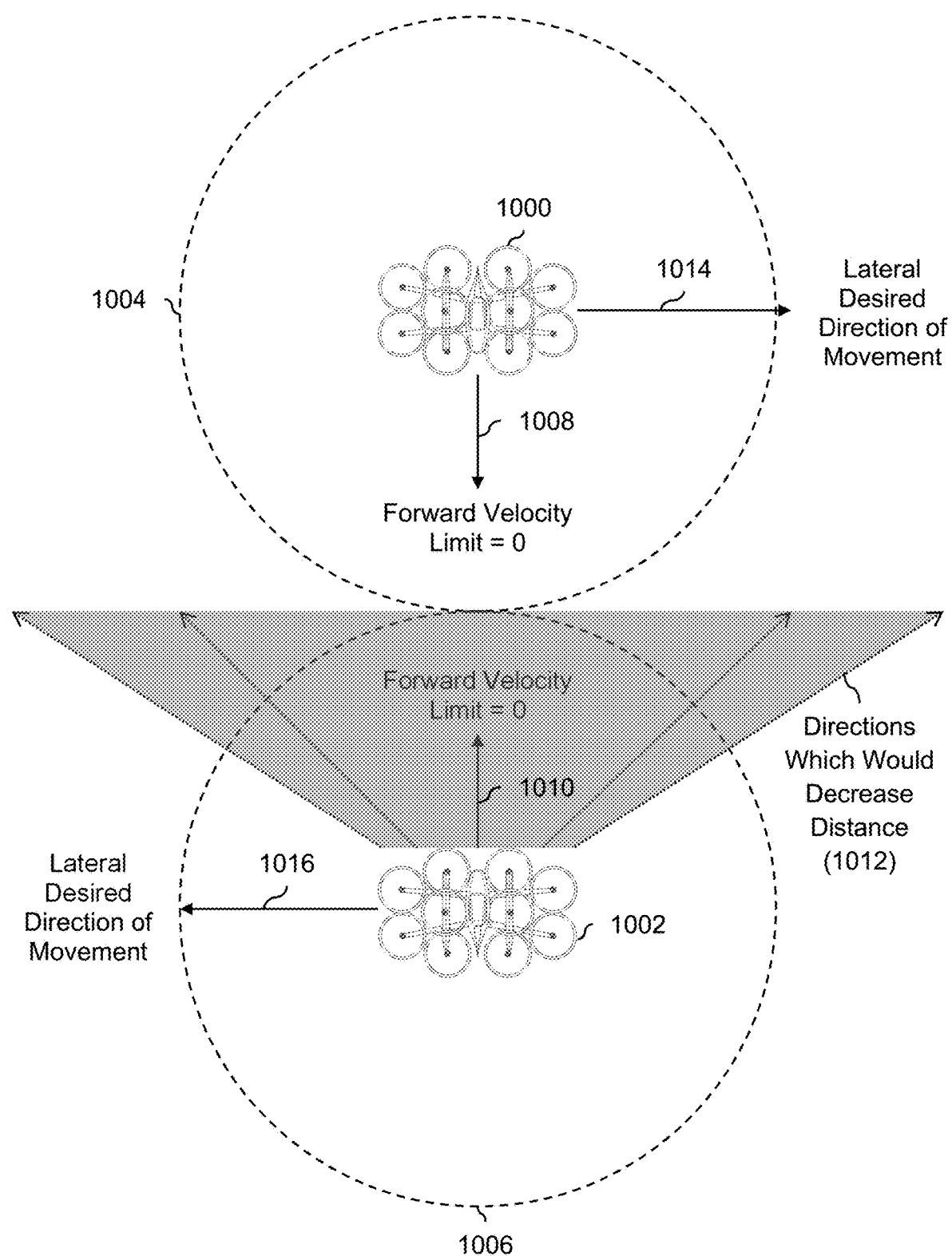
FIG. 10A is a diagram illustrating an embodiment of velocity limits which are adjusted in order to enforce a nucleoid type of geofence.

FIG. 10A is a diagram illustrating an embodiment of velocity limits which are adjusted in order to enforce a nucleoid type of geofence. In this example, a bird's eye view of a first multicopter (1000) and a second multicopter (1002) is shown where the two multicopters are facing each other. To prevent collisions, each multicopter has a conceptual or virtual "bubble" around it: bubble 1004 surrounds multicopter 1000 and bubble 1006 surrounds multicopter 1002. As each multicopter moves about, the corresponding bubble also moves so that the multicopter is always at the center of the conceptual or virtual bubble (e.g., the multicopter is like a nucleus).

In this geofencing example, the multicopters must remain at least 2r apart from each other where r is the radius of the bubbles. In other words, bubbles 1004 and 1006 can touch (as they do here), but they cannot overlap. In the state shown here, bubble 1004 is touching bubble 1006. In this situation, the forward velocity limits (1008 and 1010) of the two multicopters are set to zero because moving forward would cause the two bubbles to overlap (i.e., be closer than the permitted distance of 2r) and therefore the two multicopters are not permitted to fly forwards. The range of desired directions of movement (from the perspective of second multicopter 1002) which would bring the two closer to each other is shown as shaded region 1012. Within this range of desired directions of movement, the velocity limits in those directions are set to zero.

However, if either pilot wished to fly their multicopter sideways (e.g., along lateral desired directions of movement 1014 and 1016), this would increase the distance between the two multicopters and therefore there is no adjustment (e.g., no reduction) to a lateral velocity limit. To put it another way, there would be a non-zero (i.e., higher) velocity limit for lateral direction 1016 compared to forward direction 1010. Note for example that lateral direction 1016 does not fall within shaded region 1012 (which represents the range of movement directions which would cause the two multicopters to move closer to each other).

In one example of how this example fits into FIG. 8, the aircraft movement limit (see, e.g., step 100b) includes a velocity limit and the value is determined based at least in part on state information associated with the aircraft (see, e.g., step 100b), including by determining whether a desired direction of movement would move the aircraft closer to or further away from a second aircraft. The desired direction of movement is a type of state information associated with the aircraft because (as an example) the desired direction of movement may be received from a joystick associated with the aircraft and therefore the desired direction of movement corresponds to a state (e.g., pushed direction) of the joystick. In response to determining that the desired direction of movement would move the aircraft closer to the second aircraft, a first, lower value is selected or otherwise determined for the velocity limit (e.g., a velocity limit of zero is selected for forward direction 1010 in FIG. 10A); in response to determining that the desired direction of movement would move the aircraft further away from the second aircraft, a second, higher value is selected or otherwise determined for the velocity limit (e.g., a non-zero velocity limit is selected for lateral direction 1016).

As described above, other types of movement and/or rotation which increase or maintain the distance between two multicopters are not necessarily restricted in this manner. For example, a diagonal (e.g., forward-left or forward-right) movement may be permitted, so long as the two bubbles do not overlap and the distance between the two multicopters stays the same or increases. This may, for example, permit the two multicopters to "slide" by each other. Or, one of the multicopters may rotate to face in another direction (i.e., away from the other multicopter) and fly away.

In some embodiments, in addition to the desired direction of movement (and whether that would bring the two multicopters closer to each other), the value for the velocity limit is also determined based on the current distance between the multicopters. For example, pilots may find it annoying, counterintuitive, and/or inexplicable to have velocity limits drop when another multicopter is relatively far away. It may be more intuitive and useful if velocity limits are only reduced when two multicopters are sufficiently close to each other. For example, the following table may be used.

TABLE 1

Example Velocity Limit(s) Based on Current
Distance and Desired Direction of Movement

| Current Distance Between Multicopters is Between | Desired Direction of Movement | Velocity Limit(s) |
|---|---|---|
| 0-10 feet | Decreases Distance Between Multicopters | Set to 0 |
| 0-10 feet | Increases Distance Between Multicopters | Set to 3 MPH |
| 10 feet or more | N/A | Set to Default/Global |

In one example of how this may fit into FIG. 8, the aircraft movement limit (see, e.g., step 100b) includes a velocity limit and the value is determined based at least in part on state information associated with the aircraft (see step 100b), including by determining whether a desired direction of movement would move the aircraft closer to or further away from a second aircraft, determining a distance between the aircraft and the second aircraft, and comparing the distance to a distance threshold. If (1) the desired direction of movement would move the aircraft closer to the second aircraft and (2) the distance does not exceed the distance threshold, a first, lower value is selected or otherwise determined for the velocity limit (see, e.g., the first row in Table 1). If (1) the desired direction of movement would move the aircraft further away from the second aircraft and (2) the distance does not exceed the distance threshold, a second, higher value is selected or otherwise determined for the velocity limit (see, e.g., the second row in Table 1).

A variety of techniques may be used to calculate distances between multicopters. In one example, each multicopter continuously broadcasts its position (e.g., over a wireless channel). Each multicopter may listen for the positions of other multicopters in its vicinity and continuously calculate distances.

In some embodiments, some of this distance calculation is performed by a base station (not shown) to conserve power and/or processing resources on the multicopters. For example, each multicopter may broadcast its position (e.g., latitude, longitude, and altitude) over a wireless channel. The base station receives these positions, monitors relative distances between multicopters, and adjusts velocity limits accordingly from the base station. See, for example, FIG. 4, where base station 400 sends an instruction to a specified multicopter in order to set aircraft movement limit(s) on MC2 (404) but not on MC1 (402). Alternatively, each multicopter may track distances and set velocity limits accordingly on its own.

In some embodiments, all of the aircraft are treated like (point) charges with the same sign (e.g., a positive point charge or a negative point charge) and the aircraft movement limit is set in a manner that models the repulsive force between two charges of the same sign. The following figure shows an example of this.

Figure 10B:
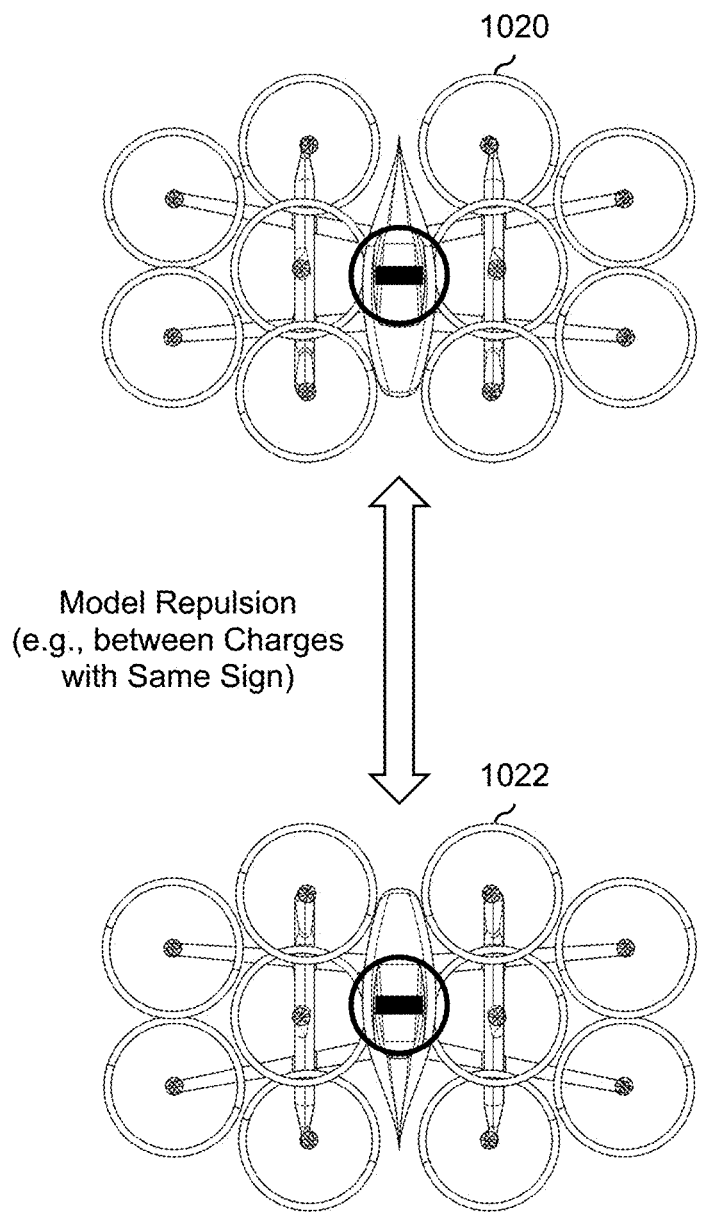
FIG. 10B is a diagram illustrating an embodiment of a modeled repulsive force as a type of aircraft movement limit to enforce a geofence.

FIG. 10B is a diagram illustrating an embodiment of a modeled repulsive force as a type of aircraft movement limit to enforce a geofence. In the example shown, both multicopters (1020 and 1022) are (e.g., conceptually) associated with the same charge (in this example, a negative point charge). To prevent the two multicopters from colliding with each other and/or enforce a geofence, a type of aircraft movement limit referred to herein as a modeled repulsive force is set. The value of this modeled repulsive force is determined based on the distance between multicopter 1020 and 1022 such that the modeled repulsive force increases as the two multicopters get closer to each other. This is sometimes referred to as a repulsive potential field model. In one example, per Coulomb's Law, the repulsive force between two point charges of the same sign (and ignoring the magnitude of the charge) varies inversely with the square of the distance between the two.

When a control signal is generated for the aircraft (see, e.g., step 106 in FIG. 2), the modeled repulsive force is used to model a repulsion between multicopter 1020 and multicopter 1022. Naturally, as the two multicopters get closer to each other, the value of the modeled repulsive force will increase and the modeled repulsion will be more pronounced and/or noticeable.

In one example, suppose that the pilot of multicopter 1020 is pushing his/her joystick forwards so that multicopter 1020 flies towards multicopter 1022 (the two multicopters are facing each other in this example). Suppose the two multicopters get relatively close to each other and then the pilot lets go of his/her joystick so that the joystick goes into a centered and/or neutral position. Normally, releasing the joystick like this would cause the multicopter to come to a gradual stop and then hover in-place. However, at close distances, the non-negligible value of the modeled repulsive force will (at least in this example) cause multicopter 1020 to come to a stop and then "bounce back" away from multicopter 1022 as a way of modeling a repulsive force between the two multicopters since they are too close to each other. This may, for example, signal or otherwise remind the pilot to stay away from the other multicopter and/or that the other multicopter is off limits. In some embodiments, as the value of the modeled repulsive force increases (e.g., because the two multicopters are closer to each other) the amount of displacement or "bounce back" is greater.

In another example of how the modeled repulsive force is used to model a repulsion between two multicopters, the modeled repulsive force may correspond to how much displacement in the joystick is required (e.g., towards the other, repelling multicopter) in order for a multicopter to hover in-place (e.g., when two multicopters get too close to each other). During normal operation (e.g., when one multicopter is not too close to another multicopter), a neutral or centered joystick position would cause the multicopter to hover in-place. However, in some embodiments, if multicopter 1020 and multicopter 1022 are too close to each other, an active or definite displacement of the joystick or other hand control is required to keep the multicopter hovering in-place. In some embodiments, a pilot would have to push the joystick further away from center in order to hover in-place more as two multicopters get closer to each other (e.g., a smaller joystick displacement is sufficient for in-place hovering when two multicopters are further away from each other).

The following figure describes this more formally and/or generally in a flowchart.

Figure 10C:
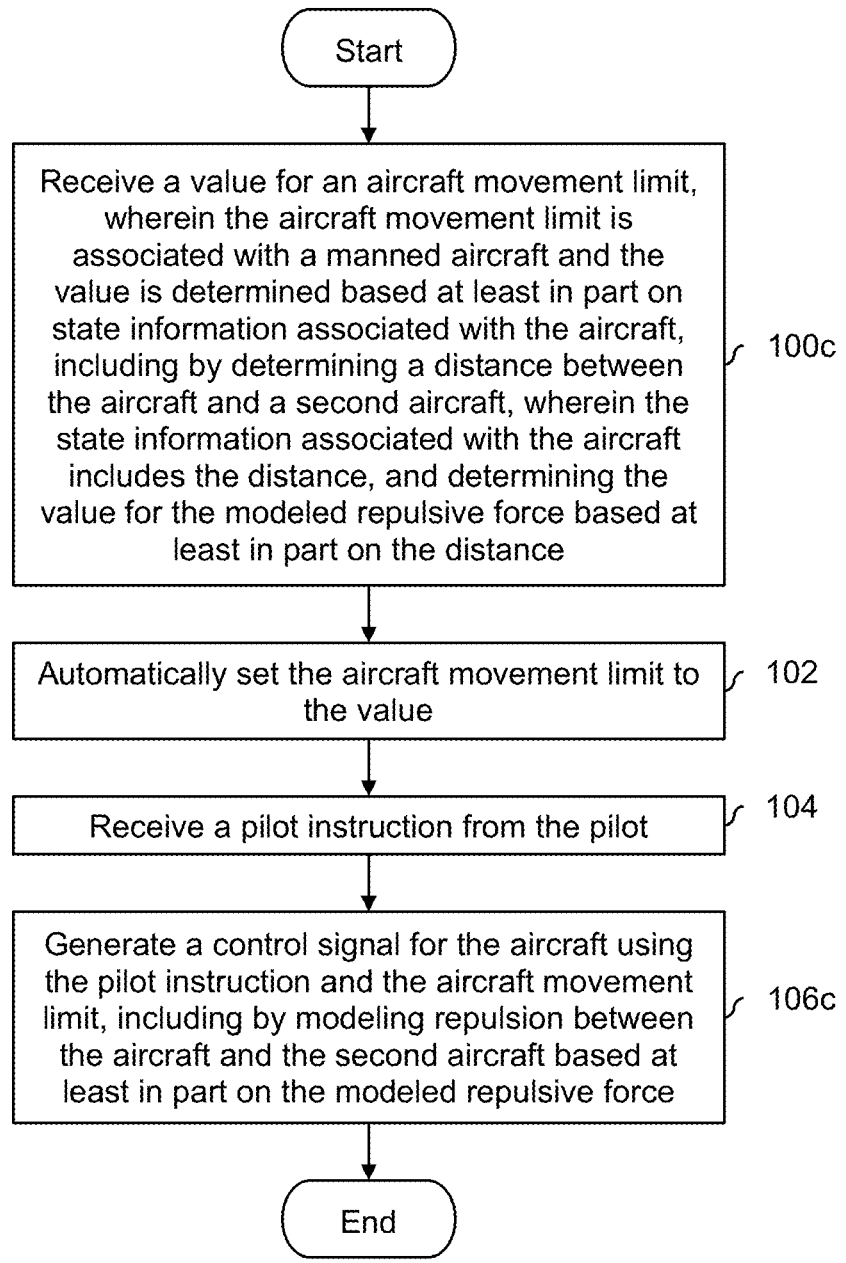
FIG. 10C is a diagram illustrating an embodiment of a process to set a modeled repulsive force as a type of aircraft movement limit.

FIG. 10C is a diagram illustrating an embodiment of a process to set a modeled repulsive force as a type of aircraft movement limit. FIG. 10C is related to FIG. 1 and for convenience the same or similar reference numbers are used to indicate related steps.

At 100c, a value is received for an aircraft movement limit, wherein the aircraft movement limit is associated with a manned aircraft and the value is determined based at least in part on state information associated with the aircraft, including by determining a distance between the aircraft and a second aircraft, wherein the state information associated with the aircraft includes the distance, and determining the value for the modeled repulsive force based at least in part on the distance. For example, the value for the modeled repulsive force may be determined or otherwise calculated to be small and/or non-negligible numbers or values when two multicopters are relatively far apart. For simplicity, the value for the modeled repulsive force may be determined to be zero at distances greater than some threshold (e.g., so that a repulsive modeling or repulsive effect does not come into play at distances above that threshold).

At 102, the aircraft movement limit is automatically set to the value. For example, the modeled repulsive force is set to the value calculated in the manner recited in step 100c.

At 104, a pilot instruction is received from the pilot. For example, the pilot instruction may be received through a joystick or some other input device.

At 106c, a control signal for the aircraft is generated using the pilot instruction and the aircraft movement limit, including by modeling repulsion between the aircraft and the second aircraft based at least in part on the modeled repulsive force. For example, as the value of the modeled repulsive force increases, the control signal would cause the aircraft to exhibit more of repulsion between itself and the second aircraft.

In some embodiments, the control signal causes the aircraft to come to a stop and subsequently move away from the second aircraft in response to an input device of the aircraft returning to a neutral position after being in a position associated with the aircraft flying towards the second aircraft. For example, the larger the modeled repulsive force is, the more "bounce back" there would be.

In some embodiments, an amount of displacement by an input device of the aircraft in order for the aircraft to hover in-place varies based at least in part on the modeled repulsive force. For example, the larger the modeled repulsive force is, the more displacement from center (e.g., for a joystick) would be required to keep the aircraft hovering in-place.

In some embodiments, an aircraft's altitude is used to adjust or otherwise set a velocity limit. The following figure shows an example of this.

Figure 11:
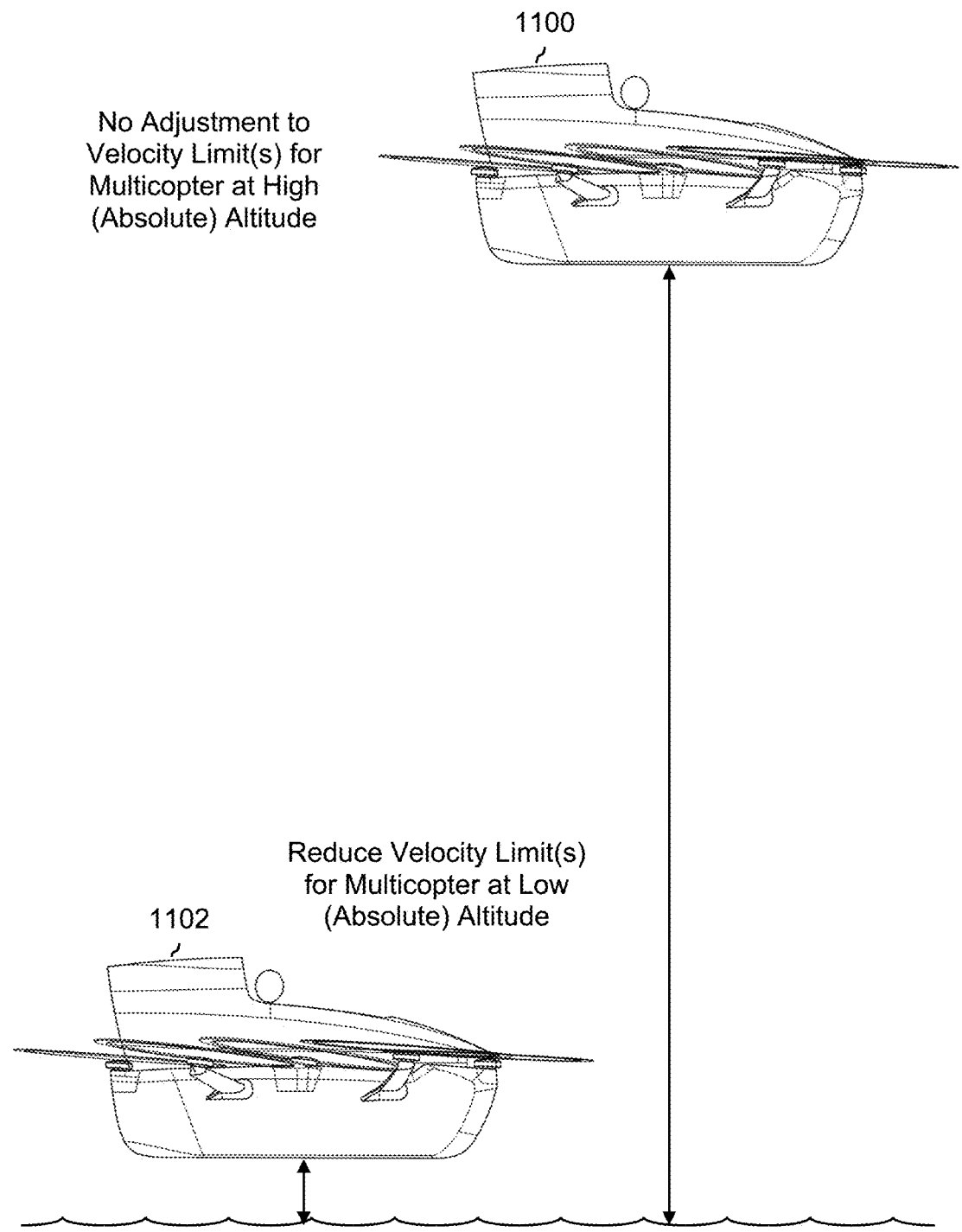
FIG. 11 is a diagram illustrating an embodiment of multicopters at different altitudes which affects their velocity limit(s).

FIG. 11 is a diagram illustrating an embodiment of multicopters at different altitudes which affects their velocity limit(s). In this example, the first, higher multicopter (1100) is at a high (e.g., absolute) altitude whereas the second, lower multicopter (1102) is at a low (e.g., absolute) altitude. In this example, a first multicopter (1100) is at a high (absolute) altitude, for example, on the order of 3 meters or higher. The second multicopter (1102) is at a low (e.g., absolute) altitude, for example, at or below the threshold of 1 meter. If something happened to the higher multicopter (e.g., a rotor goes out), the higher multicopter would have more time to slow down (e.g., using a parachute and/or by spinning up the working rotors) before hitting the water compared to the lower multicopter. To put it another way, if both the higher multicopter (1100) and the lower multicopter (1102) were traveling at the same forward velocity and hit the water due to a rotor failure (as an example), the lower multicopter is more likely to hit the water at a higher and more dangerous velocity compared to the higher multicopter.

To prevent injury to the pilot of the lower multicopter, as the multicopter approaches the surface of the water one or more velocity limits are generally reduced. In some embodiments, velocity limits in multiple or all directions (e.g., vertically, laterally, forward, within a horizontal plane, etc.) are reduced. This ensures that even if a low-flying multicopter crashes, it is going slower so that there will be less damage.

This technique may also be used to slow the multicopter down at altitudes where there are more likely to be obstacles. For example, at 50 feet up, there may be no trees, power lines, or rooflines to worry about. However, at 10 feet up, the pilot may have to maneuver around those obstacles and flying around those obstacles would be easier and safer if the multicopter had a lower velocity limit.

Unlike the velocity limit example shown in FIG. 9B, the lowest velocity limit in this example is set to a non-zero value. Reducing the velocity limit(s) to zero at the lowest range of altitudes would prevent a multicopter from landing or more generally flying near to the ground or water which would be undesirable. In some embodiments, similar to FIG. 9B, there may be multiple step-downs or limit values applied. In some embodiments, the limit values are gradually or otherwise continuously decreased.

In one example of how this example may fit into FIG. 8, the aircraft movement limit (see, e.g., step 100b) includes a velocity limit and the value is determined based at least in part on state information associated with the aircraft (see step 100b), including by determining an altitude associated with the aircraft (where the state information associated with the aircraft includes the altitude). The value for the velocity limit is determined based at least in part on the altitude where a first, higher value is determined for the velocity limit based at least in part on a first, higher altitude (see, e.g., multicopter 1100) and a second, lower value is determined for the velocity limit based at least in part on a second, lower altitude (see, e.g., multicopter 1102).

The following figure describes an example where a multicopter's velocity is used to select a value for an attitude limit.

Figure 12:
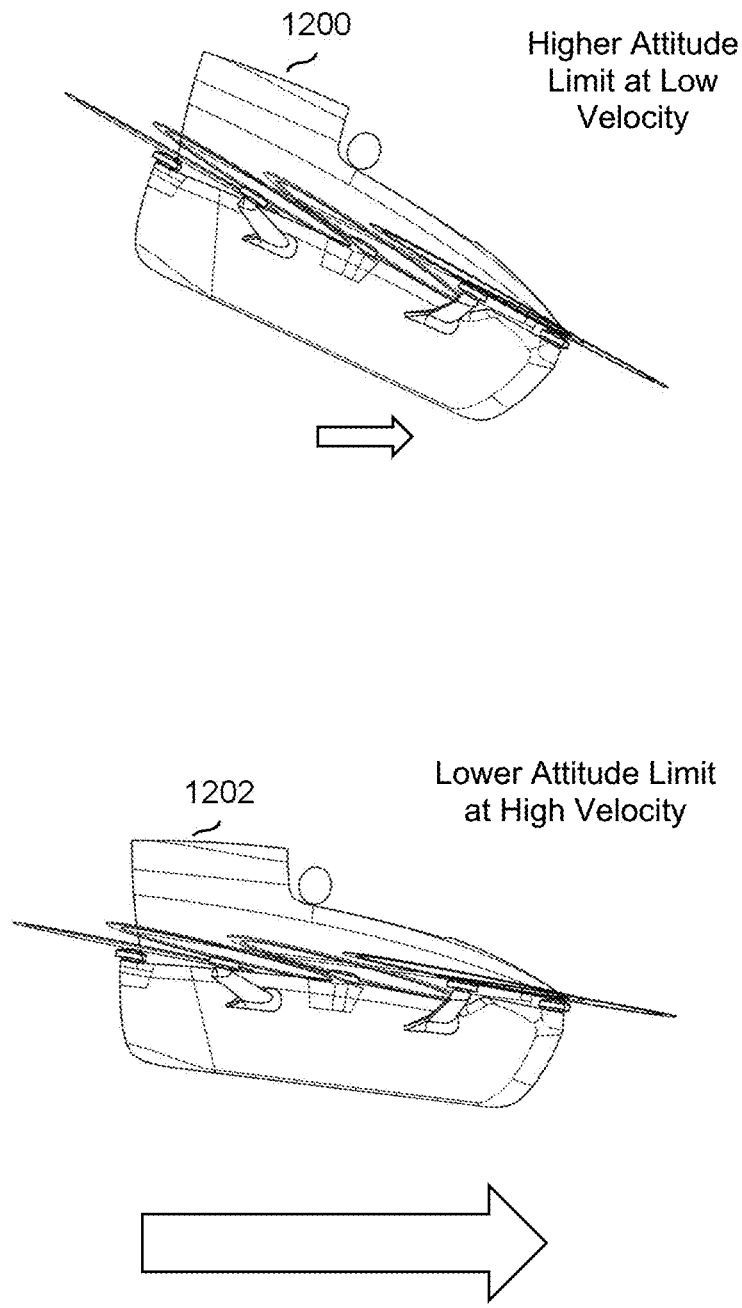
FIG. 12 is a diagram illustrating an embodiment of an attitude limit which is adjusted based on a multicopter's velocity.

FIG. 12 is a diagram illustrating an embodiment of an attitude limit which is adjusted based on a multicopter's velocity. In this example, the rotors of the multicopter can break if too much stress is applied to them. To prevent the rotors from snapping or otherwise breaking, the multicopter's attitude limit is set or otherwise adjusted based on the velocity of the multicopter.

In this example, a first multicopter (1200) is flying at a relatively slow velocity. At this velocity, the rotors of the multicopter are better able to withstand the stress due to flying at this velocity and at larger attitudes (in this example, shown as nose-down). As such, the value for the attitude limit (a type of aircraft movement limit) is set to some larger, more permissive value.

The second multicopter (1202) is flying at a faster velocity and is therefore less able to withstand the same, steeper attitude as that shown for the first multicopter. As such, because of its faster velocity, a lower value is selected for the second multicopter's attitude limit. Generally speaking, as the velocity of a multicopter increases, the value selected for an attitude limit is reduced.

For completeness, it is noted that the exemplary multicopter is capable of flying in a nose-up position and an attitude limit may relate to a limit on a nose-up position and/or a nose-down position. In some embodiments, there are two independent and/or different attitude limits: one for the nose-up limit and one for the nose-down limit. In some embodiments, the technique described herein is used to select a value for a nose-up limit.

In one example of how this example fits into FIG. 8, the aircraft movement limit (e.g., referred to in step 100b) includes an attitude limit and the value is determined based at least in part on state information associated with the aircraft (see step 100b), including by: determining a velocity associated with the aircraft (where the state information associated with the aircraft includes the velocity). The value for the attitude limit is determined based at least in part on the velocity wherein a first, lower value is determined for the attitude limit based at least in part on a first, higher velocity (see, e.g., multicopter 1202) and a second, higher value is determined for the attitude limit based at least in part on a second, lower velocity (see, e.g., multicopter 1200).

In some embodiments, the state information used to select a value for an aircraft movement limit is associated with an electrical and/or non-physical state. The following figure shows one such example where the state information is associated with motor commands or thrust signals.

Figure 13:
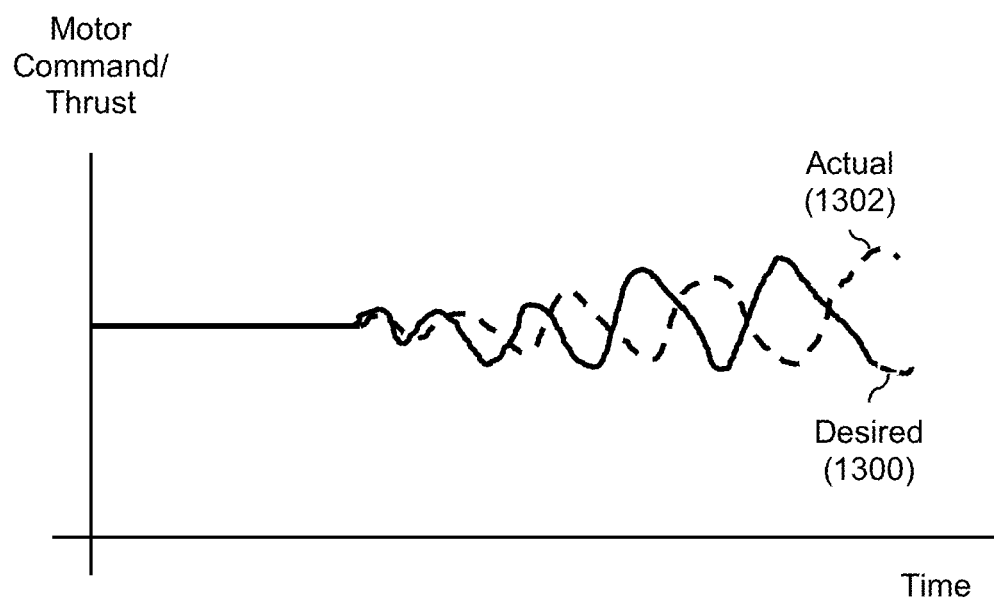
FIG. 13 is a diagram illustrating an embodiment of a pilot-induced oscillation which a velocity limit is used to correct.

FIG. 13 is a diagram illustrating an embodiment of a pilot-induced oscillation which a velocity limit is used to correct. In this example, a desired motor command or thrust signal (1300) and an actual motor command or thrust signal (1302) are shown. An inexperienced pilot can sometimes overcorrect which introduces or otherwise causes an oscillation. As shown here, the two signals gradually diverge over time (due to the pilot's actions) and begin to oscillate. The oscillations grow larger and the phase difference between the two signals eventually approaches a 180° phase difference.

To address this, in some embodiments, when the system detects that the phase difference or lag between a desired (e.g., motor command or thrust) signal and an actual (e.g., motor command or thrust) exceeds some phase difference threshold, one or more velocity limits are reduced. This has the effect of dampening or otherwise reducing the input from the pilot (e.g., via the joystick or other input device) so that the pilot cannot continue to introduce a pilot-induced oscillation. The system, without the overcorrection from the pilot, will eventually be able to correct itself and the two signals will begin to converge again (e.g., characterized by a reduced phase lag). In some embodiments, once the phase lag goes down to some sufficient degree or amount, the velocity limits are returned to their previous values.

In one example of how this example fits into FIG. 8, the aircraft movement limit (e.g., referred to in step 100*b*) includes a velocity limit and the value is determined based at least in part on state information associated with the aircraft (see step 100*b*), including by determining a phase difference between a desired motor command signal and an actual motor command signal where the state information associated with the aircraft includes the phase difference. The value for the velocity limit is determined based at least in part on the phase difference where a first, lower value is determined for the velocity limit based at least in part on a first, higher phase difference (e.g., when the phase difference gets relatively close to 180°, the velocity limit is reduced) and a second, higher value is determined for the velocity limit based at least in part on a second, lower phase difference (e.g., when the phase difference goes back to normal or a nominal value closer to 0°, the velocity limit is increased).

In some embodiments, a (e.g., training) flight or session is evaluated (e.g., using some analysis process) to determine whether to increase a constraint or limit (e.g., associated with position (including altitude), velocity, etc.) or keep it the same. For example, if a pilot demonstrated safe or good pilot behavior, a constraint or limit may be increased. Otherwise, a constraint or limit may remain unchanged. The following figure describes an example of this.

Figure 14:
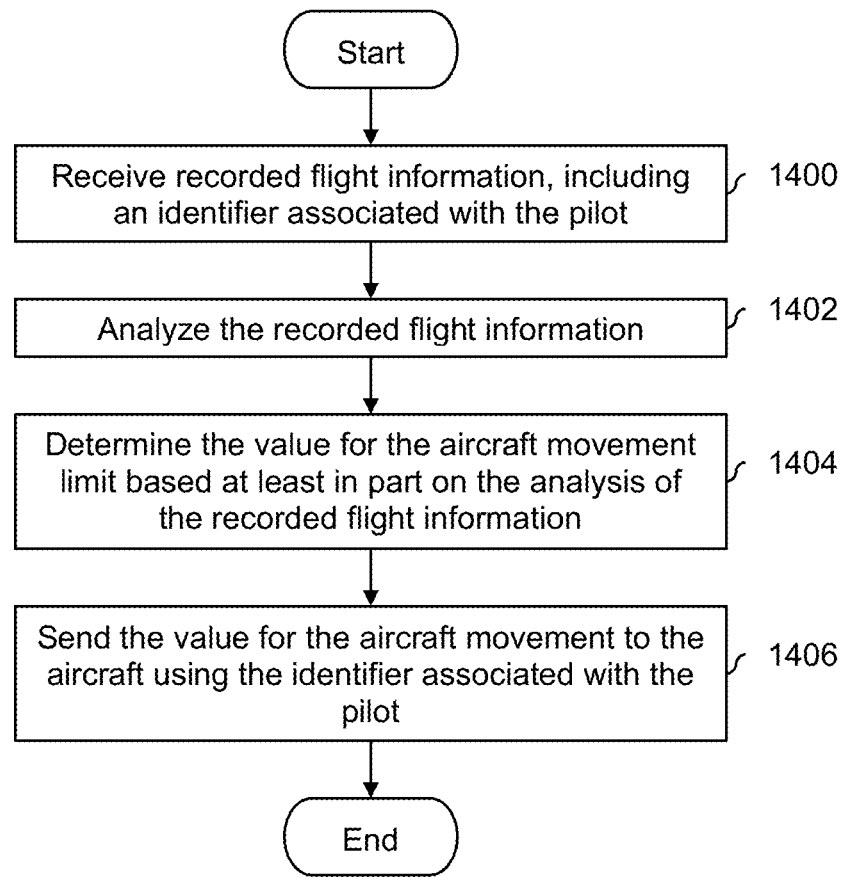
FIG. 14 is a flowchart illustrating an embodiment of a process to determine a value for an aircraft movement limit by analyzed recorded flight information.

FIG. 14 is a flowchart illustrating an embodiment of a process to determine a value for an aircraft movement limit by analyzed recorded flight information. In some embodiments, the process of FIG. 14 is performed by a central server managed by an aircraft manufacturer. In the context of FIG. 1, the value for the aircraft movement limit received at step 100 may be selected or otherwise determined using the process of FIG. 14. One benefit to this technique is that aircraft movement limits can be managed centrally and/or consistently (e.g., instead of having one (e.g., human) tester with stricter standards at one location and another (e.g., human) tester with looser standards at another location). Also, this technique permits pilots to learn how to fly the aircraft and be assessed even if they are located in remote locations far from service and/or sales locations.

At 1400, recorded flight information, including an identifier associated with the pilot, is received. For example, the recorded flight information may include position information, velocity information, and acceleration information from when an aircraft is turned on until the aircraft is turned off. In various embodiments, the recorded flight information may be exchanged via a variety of intermediary devices. In one example, there is an application running on a smartphone which communicates with the aircraft and stores the recorded flight information. The recorded flight information may then be sent from the app/smartphone to the central server (e.g., when the app/smartphone has access to a WiFi connection and/or is charging). In another example, the recorded flight information is sent to the central server via some base station (see, e.g., FIG. 4).

At 1402, the recorded flight information is analyzed. In various embodiments, the analysis tries to find or otherwise identify good or bad flying in the recorded information. For example, a sudden acceleration or deceleration may be indicative of someone who is reckless and/or cannot adequately control the aircraft. Alternatively, smooth accelerations and decelerations may be indicative of a safe pilot.

Some other examples include looking for pilot-induced oscillation by comparing a phase difference between an actual motor command or thrust signal and a desired motor command or thrust signal (see, e.g., FIG. 13). Pilot-induced oscillation may be indicative of poor flying. And the number of pilot-induced oscillations in the recorded flight information may be used to classify a pilot as a good (and/or safe) pilot versus a bad (and/or unsafe) pilot.

In some embodiments, the recorded flight information is analyzed to identify a number of times a pilot tried to cross some boundary or otherwise enter a prohibited (air)space where the aircraft automatically prevents the pilot from entering (e.g., a geofence). This number of attempted incursions may be used to classify the pilot. In some embodiments, the aircraft is not prohibited from flying in a particular airspace (e.g., there is no geofence to keep the aircraft out) but flying in that space is undesirable and/or unsafe. For example, although not prohibited from flying over land, it may be preferable or desirable that the aircraft stay over water since this is safer in the event of a crash. In some embodiments, the number of times or time spent over land is assessed. Some standards for ultralight aircraft prohibit such aircraft from flying at night, as well as over inhabited areas and the recorded flight information may be analyzed for this type of behavior.

In some embodiments, the aircraft issues a warning but does not automatically prevent the pilot from flying in a particular manner. For example, the warning may relate to flying too low (high), flying too fast, etc. In some embodiments, if the flight behavior (e.g., once a warning is issued) does not change within a certain amount of time, the pilot is assumed or otherwise determined to be ignoring the warning and the analysis of the recorded flight information may count the number of ignored warnings in order to classify the pilot.

At 1404, the value for the aircraft movement limit is determined based at least in part on the analysis of the recorded flight information. For example, if bad flying behavior is detected, the same or a more restrictive value for the aircraft movement limit may be selected or otherwise determined (e.g., keep altitude limits, velocity limits, and/or distance from shoreline limits the same or reduce). Alternatively, if good flying behavior is detected, then more permissive values may be selected or otherwise determined (e.g., increase altitude limits, velocity limits, and/or distance from shoreline limits).

At 1406 the value for the aircraft movement is sent to the aircraft using the identifier associated with the pilot. For example, the aircraft, as part of the starting up may identify the pilot and retrieve the appropriate aircraft movement limits for that pilot. A variety of methods can be used to perform step 1406. For example, all values for all pilots could be pushed out and the aircraft selects the appropriate values based on the pilot's identifier. Or, a pull technique could be used where the aircraft uploads the pilot's identifier to a central server and the appropriate value(s) for that pilot is/are downloaded in response. As before, this information may be exchanged via an app running on a smartphone or a base station.

In some embodiments, multiple pilots have access to a given flyer. A variety of techniques may be used to uniquely identify a pilot (e.g., biometrics, a code/password, a fob or other near-field identifier, an app running on a smartphone, etc.). In some embodiments, a startup sequence includes identifying the pilot and loading those pilot's limits or constraints into the system. In various embodiments, limits or other settings associated with a pilot may be stored locally and/or remotely/centrally. For example, the multicopter may store a limited number of settings (including limits) locally on the multicopter. If it cannot locate a pilot's settings there, it may go to some server (e.g., at the base station or via the base station). If a pilot's settings cannot be located (e.g., a new pilot), then some default settings and/or limits may be loaded.

The process may be useful because the aircraft can start out in a "safe mode" for novice users and gradually open up the configurations or modes (e.g., permit faster flight, higher flight, etc.) even in remote locations where there is no instructor or evaluator present to evaluate the quality of pilot's flying in person. Analyzing recorded flight information also applies a uniform standard across all pilots whereas human assessment can be inconsistent between one person and another (e.g., one instructor or evaluator may be more lenient and/or have lower standards about flying than another instructor or evaluator).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor; and
  a memory coupled with the processor, wherein the memory is configured to provide the processor with instructions which when executed cause the processor to:
    receive a value for an aircraft movement limit, wherein the aircraft movement limit is associated with a manned aircraft and includes at least one of: a position limit, a velocity limit, an altitude limit, an attitude limit, and a modeled repulsive force;
    automatically set the aircraft movement limit to the value, wherein the value is associated with a region;
    receive a pilot instruction; and
    generate a control signal for the aircraft using the pilot instruction and the aircraft movement limit, wherein the control signal constrains the aircraft to stay above the region.

2. The system recited in claim 1, wherein:
  receiving the value for the aircraft movement limit includes receiving, from a base station, an instruction to set the aircraft movement limit, wherein the instruction includes an aircraft identifier and a specified value for the aircraft movement limit; and
  setting the aircraft movement limit to the value includes:
    deciding whether to obey the instruction, including by determining if the aircraft identifier matches an identifier associated with the aircraft; and
    in response to deciding to obey the instruction, setting the aircraft movement limit to the specified value, wherein the aircraft movement limit is automatically set.

3. The system recited in claim 1, wherein:
  the value received for the aircraft movement limit is received from a base station; and
  the base station selects the value, including by:
    counting a plurality of aircraft in order to obtain a number of aircraft;
    selecting, from a plurality of floorplans, a floorplan corresponding to the number of aircraft, wherein the floorplan includes a separate region over a body of water for each aircraft in the plurality of aircraft to fly over; and
    assigning each aircraft in the plurality of aircraft to one of the regions in the floorplan.

4. The system recited in claim 1, wherein the value is determined based at least in part on state information associated with the aircraft.

5. The system recited in claim 1, wherein:
  the aircraft movement limit includes the velocity limit; and
  the value is determined based at least in part on state information associated with the aircraft, including by:
    determining a distance along a desired direction of movement from the aircraft to a boundary, wherein the state information associated with the aircraft includes the distance; and
    determining the value for the velocity limit based at least in part on the distance, wherein:
      a first, lower value is determined for the velocity limit based at least in part on a first, closer distance; and
      a second, higher value is determined for the velocity limit based at least in part on a second, farther distance.

6. The system recited in claim 1, wherein:
  the aircraft movement limit includes the velocity limit; and
  the value is determined based at least in part on state information associated with the aircraft, including by:
    determining whether a desired direction of movement would move the aircraft closer to or farther away from a second aircraft, wherein the state information associated with the aircraft includes the desired direction of movement;

in response to determining that the desired direction of movement would move the aircraft closer to the second aircraft, determining a first, lower value for the velocity limit; and in response to determining that the desired direction of movement would move the aircraft farther away from the second aircraft, determining a second, higher value for the velocity limit.

7. The system recited in claim 1, wherein:
the aircraft movement limit includes the velocity limit; and
the value is determined based at least in part on state information associated with the aircraft, including by:
determining whether a desired direction of movement would move the aircraft closer to or farther away from a second aircraft, wherein the state information associated with the aircraft includes the desired direction of movement;
determining a distance between the aircraft and the second aircraft;
comparing the distance to a distance threshold;
in response to determining that (1) the desired direction of movement would move the aircraft closer to the second aircraft and (2) the distance does not exceed the distance threshold, determining a first, lower value for the velocity limit; and
in response to determining that (1) the desired direction of movement would move the aircraft farther away from the second aircraft and (2) the distance does not exceed the distance threshold, determining a second, higher value for the velocity limit.

8. The system recited in claim 1, wherein:
the aircraft movement limit includes the modeled repulsive force;
the value for the modeled repulsive force is determined based at least in part on state information associated with the aircraft, including by:
determining a distance between the aircraft and a second aircraft, wherein the state information associated with the aircraft includes the distance; and
determining the value for the modeled repulsive force based at least in part on the distance; and
generating the control signal includes modeling repulsion between the aircraft and the second aircraft based at least in part on the modeled repulsive force.

9. The system recited in claim 1, wherein:
the aircraft movement limit includes the modeled repulsive force;
the value for the modeled repulsive force is determined based at least in part on state information associated with the aircraft, including by:
determining a distance between the aircraft and a second aircraft, wherein the state information associated with the aircraft includes the distance; and
determining the value for the modeled repulsive force based at least in part on the distance; and
generating the control signal includes modeling repulsion between the aircraft and the second aircraft based at least in part on the modeled repulsive force, wherein the control signal causes the aircraft to come to a stop and subsequently move away from the second aircraft in response to an input device of the aircraft returning to a neutral position after being in a position associated with the aircraft flying towards the second aircraft.

10. The system recited in claim 1, wherein:
the aircraft movement limit includes the modeled repulsive force;
the value for the modeled repulsive force is determined based at least in part on state information associated with the aircraft, including by:
determining a distance between the aircraft and a second aircraft, wherein the state information associated with the aircraft includes the distance; and
determining the value for the modeled repulsive force based at least in part on the distance; and
generating the control signal includes modeling repulsion between the aircraft and the second aircraft based at least in part on the modeled repulsive force, wherein an amount of displacement by an input device of the aircraft in order for the aircraft to hover in-place varies based at least in part on the modeled repulsive force.

11. The system recited in claim 1, wherein:
the aircraft movement limit includes the velocity limit; and
the value is determined based at least in part on state information associated with the aircraft, including by:
determining an altitude associated with the aircraft, wherein the state information associated with the aircraft includes the altitude; and
determining a value for the velocity limit based at least in part on the altitude, wherein:
a first, higher value is determined for the velocity limit based at least in part on a first, higher altitude; and
a second, lower value is determined for the velocity limit based at least in part on a second, lower altitude.

12. The system recited in claim 1, wherein:
the aircraft movement limit includes the attitude limit; and
the value is determined based at least in part on state information associated with the aircraft, including by:
determining a velocity associated with the aircraft, wherein the state information associated with the aircraft includes the velocity; and
determining a value for the attitude limit based at least in part on the velocity, wherein:
a first, lower value is determined for the attitude limit based at least in part on a first, higher velocity; and
a second, higher value is determined for the attitude limit based at least in part on a second, lower velocity.

13. The system recited in claim 1, wherein:
the aircraft movement limit includes the velocity limit; and
the value is determined based at least in part on state information associated with the aircraft, including by:
determining a phase difference between a desired motor command signal and an actual motor command signal, wherein the state information associated with the aircraft includes the phase difference; and
determining a value for the velocity limit based at least in part on the phase difference, wherein:
a first, lower value is determined for the velocity limit based at least in part on a first, higher phase difference; and
a second, higher value is determined for the velocity limit based at least in part on a second, lower phase difference.

14. The system recited in claim 1, wherein the value for the aircraft movement limit is determined, including by:
receiving recorded flight information, including an identifier associated with a pilot;

analyzing the recorded flight information;
determining the value for the aircraft movement limit based at least in part on the analysis of the recorded flight information; and
sending the value for the aircraft movement limit to the aircraft using the identifier associated with the pilot.

15. A method, comprising:
receiving a value for an aircraft movement limit, wherein the aircraft movement limit is associated with a manned aircraft and includes at least one of: a position limit, a velocity limit, an altitude limit, an attitude limit, and a modeled repulsive force;
automatically setting the aircraft movement limit to the value, wherein the value is associated with a region;
receiving a pilot instruction; and
generating a control signal for the aircraft using the pilot instruction and the aircraft movement limit, wherein the control signal constrains the aircraft to stay above the region.

16. A computer program product, the computer program product being embodied in a non-transitory computer readable storage medium and comprising computer instructions for:
receiving a value for an aircraft movement limit, wherein the aircraft movement limit is associated with a manned aircraft and includes at least one of: a position limit, a velocity limit, an altitude limit, an attitude limit, and a modeled repulsive force;
automatically setting the aircraft movement limit to the value, wherein the value is associated with a region;
receiving a pilot instruction; and
generating a control signal for the aircraft using the pilot instruction and the aircraft movement limit, wherein the control signal constrains the aircraft to stay above the region.

17. The method of claim 15, wherein:
receiving the value for the aircraft movement limit includes receiving, from a base station, an instruction to set the aircraft movement limit, wherein the instruction includes an aircraft identifier and a specified value for the aircraft movement limit; and
setting the aircraft movement limit to the value includes:
deciding whether to obey the instruction, including by determining if the aircraft identifier matches an identifier associated with the aircraft; and
in response to deciding to obey the instruction, setting the aircraft movement limit to the specified value, wherein the aircraft movement limit is automatically set.

18. The method of claim 15, wherein:
the value received for the aircraft movement limit is received from a base station; and
the base station selects the value, including by:
counting a plurality of aircraft in order to obtain a number of aircraft;
selecting, from a plurality of floorplans, a floorplan corresponding to the number of aircraft, wherein the floorplan includes a separate region over a body of water for each aircraft in the plurality of aircraft to fly over; and
assigning each aircraft in the plurality of aircraft to one of the regions in the floorplan.

19. The computer program product of claim 16, wherein:
receiving the value for the aircraft movement limit includes receiving, from a base station, an instruction to set the aircraft movement limit, wherein the instruction includes an aircraft identifier and a specified value for the aircraft movement limit; and
setting the aircraft movement limit to the value includes:
deciding whether to obey the instruction, including by determining if the aircraft identifier matches an identifier associated with the aircraft; and
in response to deciding to obey the instruction, setting the aircraft movement limit to the specified value, wherein the aircraft movement limit is automatically set.

20. The computer program product of claim 16, wherein:
the value received for the aircraft movement limit is received from a base station; and
the base station selects the value, including by:
counting a plurality of aircraft in order to obtain a number of aircraft;
selecting, from a plurality of floorplans, a floorplan corresponding to the number of aircraft, wherein the floorplan includes a separate region over a body of water for each aircraft in the plurality of aircraft to fly over; and
assigning each aircraft in the plurality of aircraft to one of the regions in the floorplan.

* * * * *